United States Patent
Pollack et al.

(10) Patent No.: US 9,898,778 B1
(45) Date of Patent: *Feb. 20, 2018

(54) SYSTEMS AND METHODS FOR OBTAINING AN IMAGE OF A CHECK TO BE DEPOSITED

(75) Inventors: Jeff Pollack, San Antonio, TX (US); Michael Frank Morris, San Antonio, TX (US); Bharat Prasad, San Antonio, TX (US); Frank Kyle Major, San Antonio, TX (US); John Weatherman Brady, Boerne, TX (US); Ralph Paige Mawyer, Jr., San Antonio, TX (US); Clint James Reynolds, San Antonio, TX (US); Kairav Mahesh Shah, Katy, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 560 days.

This patent is subject to a terminal disclaimer.

(21) Appl. No.: 11/877,382

(22) Filed: Oct. 23, 2007

(51) Int. Cl.
*G06Q 40/00* (2012.01)

(52) U.S. Cl.
CPC .................... *G06Q 40/00* (2013.01)

(58) Field of Classification Search
CPC ...... G06Q 40/025; G06Q 40/00; G06Q 40/02; G06Q 20/10; G06Q 20/102; G06Q 20/40; G06Q 40/04
USPC .......................................................... 705/45
See application file for complete search history.

(56) References Cited

U.S. PATENT DOCUMENTS

| | | |
|---|---|---|
| 3,005,282 A | 10/1961 | Christiansen |
| 3,341,820 A | 9/1967 | Grillmeier, Jr. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |

(Continued)

FOREIGN PATENT DOCUMENTS

| | | |
|---|---|---|
| EP | 0 984 410 A1 | 3/2000 |
| EP | 984410 A1 | 3/2000 |

OTHER PUBLICATIONS

Archive Index System; Panini My Vision X-30 or VX30 or X30 © 1994-2008 Archive Index Systems, Inc. P.O. Box 40135 Belleuvue, VA USA 98015.*

(Continued)

*Primary Examiner* — Hani M Kazimi
(74) *Attorney, Agent, or Firm* — Brinks Gilson & Lione

(57) ABSTRACT

An image of a check may be presented for payment in a banking system in place of the physical paper check. The check to be deposited can be collected from a depositor using a scanner. A web site, accessed through a depositor's web browser, can be used to drive the process of collecting the check, but in some contexts (e.g., in less popular computing environments, such as those that do not run the most popular operating systems), it is economically infeasible to obtain the certificates that would be used to allow a program executing in the web browser to control the scanner. Thus, a depositor can be instructed to capture and upload images of the check in the form of files, where the image files are then presented for payment through a banking system.

20 Claims, 7 Drawing Sheets

(56) References Cited

U.S. PATENT DOCUMENTS

| | | |
|---|---|---|
| 4,002,356 A | 1/1977 | Weidmann |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Grosbard |
| 4,636,099 A | 1/1987 | Goldstone |
| 4,640,413 A | 2/1987 | Kaplan |
| 4,644,144 A | 2/1987 | Chandek |
| 4,722,444 A | 2/1988 | Murphy |
| 4,722,544 A | 2/1988 | Weber |
| 4,727,435 A | 2/1988 | Donovan |
| 4,774,574 A | 9/1988 | Daly et al. |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,890,228 A | 12/1989 | Longfield |
| 4,927,071 A | 5/1990 | Wood |
| 4,934,587 A | 6/1990 | Mcnabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,265,008 A | 11/1993 | Benton |
| 5,321,816 A | 6/1994 | Rogan |
| 5,347,302 A | 9/1994 | Simonoff |
| 5,350,906 A | 9/1994 | Brody |
| 5,373,550 A | 12/1994 | Campbell |
| 5,419,588 A | 5/1995 | Wood |
| 5,422,467 A | 6/1995 | Graef |
| 5,444,794 A | 8/1995 | Uhland, Sr. |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,577,179 A | 11/1996 | Blank |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Lawrence |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard |
| 5,917,931 A * | 6/1999 | Kunkler ................... 382/137 |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin |
| 6,012,048 A | 1/2000 | Gustin |
| 6,014,454 A | 1/2000 | Kunkler |
| 6,021,202 A | 2/2000 | Anderson |
| 6,021,397 A | 2/2000 | Jones |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,073,119 A | 6/2000 | Bornemisza-wahr |
| 6,073,121 A | 6/2000 | Ramzy |
| 6,085,168 A | 7/2000 | Mori |
| 6,086,708 A | 7/2000 | Colgate |
| 6,089,450 A | 7/2000 | Koeple |
| 6,089,610 A | 7/2000 | Greene |
| 6,092,047 A | 7/2000 | Hyman et al. |
| 6,097,834 A | 8/2000 | Krouse |
| 6,097,845 A | 8/2000 | Ng et al. |
| 6,097,885 A | 8/2000 | Rayner |
| 6,105,865 A | 8/2000 | Hardesty |
| 6,141,339 A | 10/2000 | Kaplan et al. |
| 6,145,738 A * | 11/2000 | Stinson et al. ................ 235/379 |
| 6,151,426 A | 11/2000 | Lee |
| 6,159,585 A | 12/2000 | Rittenhouse |
| 6,170,744 B1 | 1/2001 | Lee |
| 6,178,409 B1 | 1/2001 | Weber et al. |
| 6,188,506 B1 | 2/2001 | Kaiserman |
| 6,189,785 B1 | 2/2001 | Lowery |
| 6,192,165 B1 | 2/2001 | Irons |
| 6,195,694 B1 * | 2/2001 | Chen et al. ................... 709/220 |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,523 B1 | 8/2001 | Tedesco et al. |
| 6,282,826 B1 | 9/2001 | Richards |
| 6,293,469 B1 | 9/2001 | Masson et al. |
| 6,304,860 B1 | 10/2001 | Martin, Jr. |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,162 B1 | 3/2002 | Moed et al. |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |

(56) References Cited

U.S. PATENT DOCUMENTS

| | | |
|---|---|---|
| 6,439,454 B1 | 8/2002 | Masson et al. |
| 6,449,397 B1 | 9/2002 | Che-chu |
| 6,450,403 B1 | 9/2002 | Martens |
| 6,463,220 B1 | 10/2002 | Dance et al. |
| 6,464,134 B1 | 10/2002 | Page |
| 6,469,745 B1 | 10/2002 | Yamada et al. |
| 6,470,325 B1 | 10/2002 | Leemhuis |
| 6,505,178 B1 * | 1/2003 | Flenley .......................... 705/43 |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,654,487 B1 | 11/2003 | Downs, Jr. |
| 6,661,910 B2 | 12/2003 | Jones et al. |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | Mcneal |
| 6,738,496 B1 | 5/2004 | Van Hall |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss |
| 6,763,226 B1 | 7/2004 | McZeal |
| 6,781,962 B1 | 8/2004 | Williams |
| 6,786,398 B1 | 9/2004 | Stinson |
| 6,789,054 B1 | 9/2004 | Makhlouf |
| 6,796,491 B2 | 9/2004 | Nakajima |
| 6,806,903 B1 | 10/2004 | Okisu et al. |
| 6,813,733 B1 | 11/2004 | Li |
| 6,829,704 B2 | 12/2004 | Zhang |
| 6,844,885 B2 | 1/2005 | Anderson |
| 6,856,965 B1 | 2/2005 | Stinson |
| 6,863,214 B2 | 3/2005 | Garner et al. |
| 6,870,947 B2 | 3/2005 | Kelland |
| 6,883,140 B1 | 4/2005 | Acker |
| 6,898,314 B2 | 5/2005 | Kung et al. |
| 6,902,105 B2 | 6/2005 | Koakutsu |
| 6,910,023 B1 | 6/2005 | Schibi |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,039,048 B1 | 5/2006 | Monta |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,131,571 B2 | 11/2006 | Swift et al. |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan |
| 7,184,980 B2 | 2/2007 | Allen-Rouman et al. |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones et al. |
| 7,356,505 B2 | 4/2008 | March |
| 7,377,425 B1 | 5/2008 | Ma |
| 7,379,978 B2 | 5/2008 | Anderson |
| 7,383,227 B2 | 6/2008 | Weinflash et al. |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,421,107 B2 | 9/2008 | Lugg |
| 7,421,410 B1 | 9/2008 | Schechtman et al. |
| 7,427,016 B2 | 9/2008 | Chimento |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,464,859 B1 | 12/2008 | Hawkins |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Satou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |

(56) References Cited

U.S. PATENT DOCUMENTS

| | | |
|---|---|---|
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,609,889 B2 | 10/2009 | Guo et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,668,363 B2 | 2/2010 | Price |
| 7,672,022 B1 | 3/2010 | Fan |
| 7,672,940 B2 | 3/2010 | Viola |
| 7,676,409 B1 | 3/2010 | Ahmad |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,720,735 B2 | 5/2010 | Anderson et al. |
| 7,734,545 B1 | 6/2010 | Fogliano |
| 7,743,979 B2 | 6/2010 | Fredman |
| 7,753,268 B1 | 7/2010 | Robinson et al. |
| 7,761,358 B2 | 7/2010 | Craig et al. |
| 7,766,244 B1 | 8/2010 | Field |
| 7,769,650 B2 | 8/2010 | Bleunven |
| 7,772,685 B2 | 8/2010 | Oakes, III et al. |
| 7,792,752 B1 | 9/2010 | Kay |
| 7,792,753 B1 | 9/2010 | Slater et al. |
| 7,810,714 B2 | 10/2010 | Murata |
| 7,812,986 B2 | 10/2010 | Graham et al. |
| 7,818,245 B2 | 10/2010 | Prakash et al. |
| 7,831,458 B2 | 11/2010 | Neumann |
| 7,856,402 B1 | 12/2010 | Kay |
| 7,865,384 B2 | 1/2011 | Anderson et al. |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,895,054 B2 | 2/2011 | Slen et al. |
| 7,896,232 B1 | 3/2011 | Prasad et al. |
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,949,587 B1 | 5/2011 | Morris et al. |
| 7,950,698 B2 | 5/2011 | Popadic et al. |
| 7,953,441 B2 | 5/2011 | Lors |
| 7,958,053 B2 | 6/2011 | Stone |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,979,326 B2 | 7/2011 | Kurushima |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 8,060,442 B1 | 11/2011 | Hecht et al. |
| 8,065,307 B2 | 11/2011 | Haslam et al. |
| 8,091,778 B1 | 1/2012 | Block et al. |
| 8,116,533 B2 | 2/2012 | Kiplinger et al. |
| 8,159,520 B1 | 4/2012 | Dhanoa |
| 8,203,640 B2 | 6/2012 | Kim et al. |
| 8,204,293 B2 | 6/2012 | Csulits et al. |
| 8,235,284 B1 | 8/2012 | Prasad et al. |
| 8,266,076 B2 | 9/2012 | Lopez et al. |
| 8,271,385 B2 | 9/2012 | Emerson et al. |
| 8,290,237 B1 | 10/2012 | Burks et al. |
| 8,320,657 B1 | 11/2012 | Burks et al. |
| 8,351,677 B1 | 1/2013 | Oakes, III et al. |
| 8,358,826 B1 | 1/2013 | Medina et al. |
| 8,364,563 B2 | 1/2013 | Choiniere, Sr. |
| 8,392,332 B1 | 3/2013 | Oakes, III et al. |
| 8,401,962 B1 | 3/2013 | Bent et al. |
| 8,422,758 B1 | 4/2013 | Bueche, Jr. |
| 8,433,647 B1 | 4/2013 | Yarbrough |
| 8,559,766 B2 | 10/2013 | Tilt et al. |
| 8,582,862 B2 | 11/2013 | Nepomniachtchi et al. |
| 8,732,081 B1 | 5/2014 | Oakes et al. |
| 8,799,147 B1 | 8/2014 | Walls et al. |
| 2001/0004235 A1 | 6/2001 | Maloney |
| 2001/0014881 A1 | 8/2001 | Drummond |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski et al. |
| 2001/0047330 A1 | 11/2001 | Gephart |
| 2001/0054020 A1 | 12/2001 | Barth |
| 2002/0001393 A1 | 1/2002 | Jones |
| 2002/0016763 A1 | 2/2002 | March |
| 2002/0016769 A1 | 2/2002 | Barbara et al. |
| 2002/0026418 A1 | 2/2002 | Koppel et al. |
| 2002/0032656 A1 | 3/2002 | Chen |
| 2002/0038289 A1 | 3/2002 | Lawlor et al. |
| 2002/0040340 A1 | 4/2002 | Yoshida |
| 2002/0052841 A1 | 5/2002 | Guthrie |
| 2002/0052853 A1 | 5/2002 | Munoz |
| 2002/0065786 A1 | 5/2002 | Martens |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107767 A1 | 8/2002 | McClair et al. |
| 2002/0107809 A1* | 8/2002 | Biddle et al. .................. 705/59 |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0120582 A1 | 8/2002 | Elston et al. |
| 2002/0129249 A1 | 9/2002 | Maillard et al. |
| 2002/0130868 A1 | 9/2002 | Smith |
| 2002/0133409 A1 | 9/2002 | Sawano et al. |
| 2002/0138522 A1 | 9/2002 | Muralidhar |
| 2002/0147798 A1* | 10/2002 | Huang ......................... 709/220 |
| 2002/0150279 A1 | 10/2002 | Scott |
| 2002/0150311 A1 | 10/2002 | Lynn |
| 2002/0152160 A1 | 10/2002 | Allen-Rouman et al. |
| 2002/0152161 A1 | 10/2002 | Aoike |
| 2002/0152164 A1* | 10/2002 | Dutta et al. ...................... 705/43 |
| 2002/0152165 A1* | 10/2002 | Dutta et al. ...................... 705/43 |
| 2002/0152169 A1 | 10/2002 | Dutta |
| 2002/0159648 A1 | 10/2002 | Alderson et al. |
| 2002/0171820 A1 | 11/2002 | Okamura |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0009420 A1 | 1/2003 | Jones |
| 2003/0015583 A1 | 1/2003 | Abdi et al. |
| 2003/0026609 A1 | 2/2003 | Parulski |
| 2003/0038227 A1 | 2/2003 | Sesek |
| 2003/0050889 A1 | 3/2003 | Burke |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |

(56) References Cited

U.S. PATENT DOCUMENTS

| | | |
|---|---|---|
| 2003/0105688 A1 | 6/2003 | Brown et al. |
| 2003/0105714 A1* | 6/2003 | Alarcon-Luther et al. ..... 705/41 |
| 2003/0126078 A1 | 7/2003 | Vihinen |
| 2003/0126082 A1 | 7/2003 | Omura et al. |
| 2003/0130940 A1 | 7/2003 | Hansen et al. |
| 2003/0132384 A1 | 7/2003 | Sugiyama et al. |
| 2003/0133610 A1 | 7/2003 | Nagarajan et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0202690 A1 | 10/2003 | Jones et al. |
| 2003/0023557 A1 | 11/2003 | Moore |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0044606 A1 | 3/2004 | Buttridge et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1* | 4/2004 | Bean et al. .................. 358/505 |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0111371 A1 | 6/2004 | Friedman |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0184766 A1 | 9/2004 | Kim et al. |
| 2004/0210515 A1 | 10/2004 | Hughes |
| 2004/0210523 A1 | 10/2004 | Gains et al. |
| 2004/0225604 A1 | 11/2004 | Foss, Jr. et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0015332 A1 | 1/2005 | Chen |
| 2005/0021466 A1 | 1/2005 | Buchanan et al. |
| 2005/0030388 A1 | 2/2005 | Stavely et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Shimamura |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0078336 A1* | 4/2005 | Ferlitsch .................... 358/1.15 |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0089209 A1 | 4/2005 | Stefanuk |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1 | 5/2005 | Singfield |
| 2005/0097050 A1 | 5/2005 | Orcutt |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177494 A1 | 8/2005 | Kelly et al. |
| 2005/0177499 A1 | 8/2005 | Thomas |
| 2005/0177510 A1 | 8/2005 | Hilt et al. |
| 2005/0177518 A1 | 8/2005 | Brown |
| 2005/0182710 A1 | 8/2005 | Andersson |
| 2005/0188306 A1* | 8/2005 | Mackenzie ................... 715/530 |
| 2005/0203430 A1 | 9/2005 | Williams et al. |
| 2005/0205661 A1 | 9/2005 | Taylor |
| 2005/0209961 A1 | 9/2005 | Michelsen |
| 2005/0213805 A1 | 9/2005 | Blake et al. |
| 2005/0218209 A1 | 10/2005 | Heilper et al. |
| 2005/0220324 A1 | 10/2005 | Klein et al. |
| 2005/0228733 A1 | 10/2005 | Bent et al. |
| 2005/0244035 A1 | 11/2005 | Klein et al. |
| 2005/0252955 A1 | 11/2005 | Sugai |
| 2005/0267843 A1 | 12/2005 | Acharya |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeComte |
| 2005/0281474 A1 | 12/2005 | Huang |
| 2005/0289030 A1 | 12/2005 | Smith |
| 2005/0289182 A1 | 12/2005 | Pandian et al. |
| 2006/0002426 A1 | 1/2006 | Madour |
| 2006/0004660 A1 | 1/2006 | Pranger |
| 2006/0025697 A1 | 2/2006 | Kurzweil |
| 2006/0039628 A1 | 2/2006 | Li et al. |
| 2006/0039629 A1 | 2/2006 | Li |
| 2006/0041506 A1 | 2/2006 | Mason et al. |
| 2006/0045321 A1* | 3/2006 | Yu ................. 382/137 |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0064368 A1 | 3/2006 | Forte |
| 2006/0080245 A1 | 4/2006 | Bahl |
| 2006/0085357 A1 | 4/2006 | Pizarro |
| 2006/0085516 A1* | 4/2006 | Farr et al. .................... 709/217 |
| 2006/0102704 A1 | 5/2006 | Reynders |
| 2006/0106691 A1 | 5/2006 | Sheaffer |
| 2006/0106717 A1 | 5/2006 | Randle |
| 2006/0108168 A1 | 5/2006 | Fischer et al. |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu |
| 2006/0118613 A1 | 6/2006 | McMann |
| 2006/0124730 A1 | 6/2006 | Maloney |
| 2006/0144924 A1 | 7/2006 | Stover |

(56) References Cited

U.S. PATENT DOCUMENTS

| | | |
|---|---|---|
| 2006/0144937 A1 | 7/2006 | Heilper et al. |
| 2006/0144950 A1 | 7/2006 | Johnson |
| 2006/0159367 A1 | 7/2006 | Zeineh et al. |
| 2006/0161499 A1 | 7/2006 | Rich et al. |
| 2006/0161501 A1 | 7/2006 | Waserstein |
| 2006/0164682 A1 | 7/2006 | Lev |
| 2006/0166178 A1 | 7/2006 | Driedijk |
| 2006/0167818 A1 | 7/2006 | Wentker et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson |
| 2006/0242063 A1* | 10/2006 | Peterson et al. ............... 705/42 |
| 2006/0249567 A1* | 11/2006 | Byrne et al. ................. 235/379 |
| 2006/0274164 A1 | 12/2006 | Kimura et al. |
| 2006/0279628 A1 | 12/2006 | Fleming |
| 2006/0282383 A1 | 12/2006 | Doran |
| 2006/0291744 A1 | 12/2006 | Ikeda et al. |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | VanDeburg et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0124241 A1 | 5/2007 | Newton |
| 2007/0127805 A1 | 6/2007 | Foth et al. |
| 2007/0129955 A1 | 6/2007 | Dalmia |
| 2007/0136198 A1 | 6/2007 | Foth |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0154098 A1 | 7/2007 | Geva et al. |
| 2007/0156438 A1 | 7/2007 | Popadic |
| 2007/0168265 A1 | 7/2007 | Rosenberger |
| 2007/0168283 A1 | 7/2007 | Alvarez et al. |
| 2007/0171288 A1 | 7/2007 | Inoue |
| 2007/0172107 A1 | 7/2007 | Jones et al. |
| 2007/0172148 A1 | 7/2007 | Hawley |
| 2007/0179883 A1 | 8/2007 | Questembert |
| 2007/0183000 A1 | 8/2007 | Eisen et al. |
| 2007/0183741 A1* | 8/2007 | Lerman et al. ................ 386/54 |
| 2007/0194102 A1 | 8/2007 | Cohen |
| 2007/0198432 A1 | 8/2007 | Pitroda et al. |
| 2007/0203708 A1 | 8/2007 | Polycn et al. |
| 2007/0208816 A1 | 9/2007 | Baldwin et al. |
| 2007/0214086 A1 | 9/2007 | Homoki |
| 2007/0217669 A1 | 9/2007 | Swift et al. |
| 2007/0233525 A1 | 10/2007 | Boyle |
| 2007/0233585 A1 | 10/2007 | Ben Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0268540 A1* | 11/2007 | Gaspardo et al. ............. 359/201 |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0021802 A1 | 1/2008 | Pendleton |
| 2008/0040280 A1* | 2/2008 | Davis et al. .................... 705/45 |
| 2008/0052182 A1 | 2/2008 | Marshall |
| 2008/0059376 A1 | 3/2008 | Davis |
| 2008/0063253 A1 | 3/2008 | Wood |
| 2008/0068674 A1 | 3/2008 | McIntyre |
| 2008/0071721 A1 | 3/2008 | Wang |
| 2008/0073423 A1 | 3/2008 | Heit et al. |
| 2008/0080760 A1 | 4/2008 | Ronca |
| 2008/0086420 A1 | 4/2008 | Gilder et al. |
| 2008/0086421 A1 | 4/2008 | Gilder |
| 2008/0086770 A1 | 4/2008 | Kulkarni et al. |
| 2008/0091599 A1 | 4/2008 | Foss, Jr. |
| 2008/0097899 A1 | 4/2008 | Jackson et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones |
| 2008/0140579 A1 | 6/2008 | Sanjiv |
| 2008/0147549 A1 | 6/2008 | Ruthbun |
| 2008/0155672 A1 | 6/2008 | Sharma |
| 2008/0156438 A1 | 7/2008 | Stumphauzer |
| 2008/0162319 A1 | 7/2008 | Breeden et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder |
| 2008/0249951 A1 | 10/2008 | Gilder et al. |
| 2008/0262950 A1 | 10/2008 | Christensen et al. |
| 2008/0262953 A1 | 10/2008 | Anderson |
| 2008/0275821 A1 | 11/2008 | Bishop et al. |
| 2008/0301441 A1 | 12/2008 | Calman et al. |
| 2008/0316542 A1* | 12/2008 | Mindrum et al. ............. 358/442 |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Inokuchi |
| 2009/0108080 A1 | 4/2009 | Meyer |
| 2009/0110281 A1 | 4/2009 | Hirabayashi |
| 2009/0141962 A1 | 6/2009 | Borgia |
| 2009/0164350 A1 | 6/2009 | Sorbe et al. |
| 2009/0164370 A1 | 6/2009 | Sorbe et al. |

(56) References Cited

U.S. PATENT DOCUMENTS

| | | |
|---|---|---|
| 2009/0166406 A1 | 7/2009 | Pigg et al. |
| 2009/0167870 A1 | 7/2009 | Caleca et al. |
| 2009/0171819 A1 | 7/2009 | Von Martin |
| 2009/0171825 A1 | 7/2009 | Roman |
| 2009/0173781 A1 | 7/2009 | Ramachandran |
| 2009/0185241 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0190823 A1 | 7/2009 | Walters |
| 2009/0192938 A1 | 7/2009 | Amos |
| 2009/0212929 A1 | 8/2009 | Drory et al. |
| 2009/0236413 A1 | 9/2009 | Mueller et al. |
| 2009/0252437 A1 | 10/2009 | Li |
| 2009/0254447 A1 | 10/2009 | Blades |
| 2009/0263019 A1 | 10/2009 | Tzadok et al. |
| 2009/0271287 A1 | 10/2009 | Halpern |
| 2009/0281904 A1 | 11/2009 | Pharris |
| 2009/0284637 A1 | 11/2009 | Parulski et al. |
| 2009/0290751 A1 | 11/2009 | Ferman et al. |
| 2009/0292628 A1 | 11/2009 | Dryer et al. |
| 2009/0313167 A1 | 12/2009 | Dujari |
| 2009/0319425 A1 | 12/2009 | Tumminaro et al. |
| 2010/0007899 A1 | 1/2010 | Lay |
| 2010/0027679 A1 | 2/2010 | Sunahara et al. |
| 2010/0030687 A1 | 2/2010 | Panthaki et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0082468 A1 | 4/2010 | Low et al. |
| 2010/0082470 A1 | 4/2010 | Walach |
| 2010/0165015 A1 | 7/2010 | Barkley et al. |
| 2010/0225773 A1 | 9/2010 | Lee |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0274693 A1 | 10/2010 | Bause et al. |
| 2010/0312705 A1* | 12/2010 | Caruso et al. ............... 705/45 |
| 2011/0016084 A1 | 1/2011 | Mundy et al. |
| 2011/0069180 A1 | 3/2011 | Nijemcevic et al. |
| 2011/0112967 A1 | 5/2011 | Anderson et al. |
| 2011/0170740 A1 | 7/2011 | Coleman |
| 2011/0191161 A1 | 8/2011 | Dai |
| 2011/0251956 A1 | 10/2011 | Cantley et al. |
| 2011/0280450 A1 | 11/2011 | Nepomniachtchi et al. |
| 2011/0285874 A1 | 11/2011 | Showering et al. |
| 2011/0310442 A1 | 12/2011 | Popadic et al. |
| 2012/0047070 A1 | 2/2012 | Pharris |
| 2012/0062732 A1 | 3/2012 | Marman et al. |
| 2012/0089514 A1 | 4/2012 | Kraemling et al. |
| 2012/0185388 A1 | 7/2012 | Pranger |
| 2012/0229872 A1 | 9/2012 | Dolev |
| 2013/0021651 A9 | 1/2013 | Popadic et al. |

OTHER PUBLICATIONS

Federal Check 21 Act; "New Check 21 Act Effective Oct. 28,2004: Banks No Longer Will Return Original Cancelled Checks," Consumer Union's FAQ's and Congressional Testimony on Check 21; www.consumerlaw.org/iinitiatives/content/check21_content.html; downloaded Dec. 2005; 20 pages.

The Automated Clearinghouse, "Retail Payment Systems; Payment Instruments, Clearing and Settlement; The Automated Clearinghouse (ACH);" www.ffiec.gov/ffiecinfobase/booklets/Retail/retail_02d.html; downloaded Dec. 2005; 3 pages.

Fest, G.; "Patently Unaware;" Bank Technology News; http://banktechnews.com/article.html?id=20060403T7612618; downloaded Apr. 2006; 5 pages.

Blue Mountain Consulting; www.bluemountainconsulting.com/, downloaded Apr. 26, 2006; 3 pages.

Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46.

Alves, Vander and Borba, Paulo; "Distributed Adapters Pattern: A Design Pattern for Object-Oriented Distributed Applications"; First Latin American Conference on Pattern Languages of Programming; Oct. 2001; pp. 132-142; Rio de Janeiro, Brazil.

Rao, Bharat; "The Internet and the Revolution in Distribution: A Cross-Industry Examination"; Technology in Society; 1999; pp. 287-306; vol. 21, No. 3.

DeYoung, Robert; "The Financial Performance of Pure Play Internet Banks"; Federal Reserve Bank of Chicago Economic Perspectives; 2001; pp. 60-75; vol. 25, No. 1.

Application as filed Apr. 3, 2008 for U.S. Appl. No. 12/062,143 (27 pgs).

Application as filed Aug. 19, 2010 for U.S. Appl. No. 12/859,741 (235 pgs).

Application as filed Aug. 21, 2008 for U.S. Appl. No. 12/195,723 (38 pgs).

Application as filed Aug. 21, 2009 for U.S. Appl. No. 12/545,127 (45 pgs).

Application as filed Aug. 28, 2009 for U.S. Appl. No. 12/549,443 (41 pgs).

Application as filed Dec. 20, 2006 for U.S. Appl. No. 11/613,656 (21 pgs).

Application as filed Dec. 30, 2010 for U.S. Appl. No. 12/982,494 (280 pgs).

Application as filed Dec. 30, 2010 for U.S. Appl. No. 12/982,561 (275 pgs).

Application as filed Dec. 30, 2010 for U.S. Appl. No. 12/982,578 (274 pgs).

Application as filed Dec. 30, 2010 for U.S. Appl. No. 12/982,594 (275 pgs).

Application as filed Feb. 18, 2009 for U.S. Appl. No. 12/388,005 (37 pgs).

Application as filed Jul. 13, 2006 for U.S. Appl. No. 11/487,537 (23 pgs).

Application as filed Jul. 27, 2009 for U.S. Appl. No. 12/509,613 (48 pgs).

Application as filed Jul. 27, 2009 for U.S. Appl. No. 12/509,680 (41 pgs).

Application as filed Jun. 11, 2008 for U.S. Appl. No. 12/137,051 (29 pgs).

Application as filed Jun. 8, 2011 for U.S. Appl. No. 13/155,976 (352 pgs).

Application as filed Jun. 8, 2011 for U.S. Appl. No. 13/156,007 (356 pgs).

Application as filed Jun. 8, 2011 for U.S. Appl. No. 13/156,018 (353 pgs).

Application as filed Mar. 15, 2007 for U.S. Appl. No. 11/686,924 (34 pgs).

Application as filed Mar. 15, 2007 for U.S. Appl. No. 11/686,928 (36 pgs).

Application as filed Mar. 4, 2009 for U.S. Appl. No. 12/397,671 (40 pgs).

Application as filed Mar. 4, 2009 for U.S. Appl. No. 12/397,930 (37 pgs).

Application as filed May 10, 2007 for U.S. Appl. No. 11/747,222 (35 pgs).

Application as filed Oct. 17, 2008 for U.S. Appl. No. 12/253,278 (42 pgs).

Application as filed Oct. 23, 2007 for U.S. Appl. No. 11/876,925 (36 pgs).

Application as filed Oct. 23, 2007 for U.S. Appl. No. 11/877,335 (29 pgs).

Application as filed Oct. 25, 2007 for U.S. Appl. No. 11/923,839 (22 pgs).

Application as filed Oct. 29, 2007 for U.S. Appl. No. 11/926,388 (23 pgs).

Application as filed Oct. 30, 2007 for U.S. Appl. No. 11/928,297 (26 pgs).

Application as filed Oct. 31, 2006 for U.S. Appl. No. 11/590,974 (31 pgs).

Application as filed Oct. 31, 2006 for U.S. Appl. No. 11/591,008 (27 pgs).

(56) References Cited

OTHER PUBLICATIONS

Application as filed Oct. 31, 2006 for U.S. Appl. No. 11/591,227 (58 pgs).
Application as filed Oct. 31, 2006 for U.S. Appl. No. 11/591,273 (56 pgs).
Application as filed Oct. 31, 2007 for U.S. Appl. No. 11/930,537 (27 pgs).
Application as filed Oct. 31, 2007 for U.S. Appl. No. 11/931,670 (47 pgs).
Application as filed Oct. 8, 2007 for U.S. Appl. No. 11/868,884 (30 pgs).
Application as filed Sep. 28, 2007 for U.S. Appl. No. 11/864,569 (35 pgs).
Application as filed Sep. 8, 2008 for U.S. Appl. No. 12/205,996 (30 pgs).
Claims as filed Apr. 3, 2008 for U.S. Appl. No. 12/062,163 (3 pgs).
Claims as filed Apr. 3, 2008 for U.S. Appl. No. 12/062,175 (3 pgs).
Claims as filed Aug. 19, 2010 for U.S. Appl. No. 12/859,752 (5 pgs).
Claims as filed Dec. 15, 2011 for U.S. Appl. No. 13/327,478 (4 pgs).
Claims as filed Dec. 20, 2006 for U.S. Appl. No. 11/613,671 (3 pgs).
Claims as filed Dec. 8, 2010 for U.S. Appl. No. 12/963,513 (7 pgs).
Claims as filed Feb. 16, 2011 for U.S. Appl. No. 13/028,477 (3 pgs).
Claims as filed Jan. 20, 2011 for U.S. Appl. No. 13/010,644 (9 pgs).
Claims as filed Jan. 31, 2011 for U.S. Appl. No. 13/017,865 (11 pgs).
Claims as filed Mar. 15, 2007 for U.S. Appl. No. 11/686,925 (5 pgs).
Claims as filed May 10, 2007 for U.S. Appl. No. 11/747,223 (4 pgs).
Claims as filed May 18, 2011 for U.S. Appl. No. 13/110,077 (9 pgs).
Claims as filed May 2, 2011 for U.S. Appl. No. 13/098,566 (10 pgs).
Claims as filed Oct. 23, 2007 for U.S. Appl. No. 11/877,382 (6 pgs).
Claims as filed Oct. 24, 2008 for U.S. Appl. No. 12/257,471 (4 pgs).
Claims as filed Oct. 31, 2006 for U.S. Appl. No. 11/590,963 (3 pgs).
Claims as filed Oct. 31, 2006 for U.S. Appl. No. 11/590,995 (3 pgs).
Claims as filed Oct. 31, 2006 for U.S. Appl. No. 11/590,998 (4 pgs).
Claims as filed Oct. 31, 2007 for U.S. Appl. No. 11/931,804 (4 pgs).
Claims as filed Oct. 8, 2007 for U.S. Appl. No. 11/868,878 (4 pgs).
Claims as filed Sep. 2, 2008 for U.S. Appl. No. 12/202,781 (4 pgs).
Claims as filed Sep. 8, 2008 for U.S. Appl. No. 12/206,001 (3 pgs).
Claims as filed Sep. 8, 2008 for U.S. Appl. No. 12/206,007 (3 pgs).
White, J.M. et al., "Image Thresholding for Optical Character Recognition and Other Applications Requiring Character Image Extraction", IBM J. RES. Development, Jul. 1983, vol. 27, No. 4 (12 pgs).
Ritzer, J.R. "Hinky Dinky helped spearhead POS, remote banking movement", Bank Systems and Equipment, vol. 21, No. 12, Dec. 1984 (1 pg).
Dinan, R.F. et al., "Image Plus High Performance Transaction System", IBM Systems Journal, 1990 vol. 29, No. 3 (14 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).
Zhang, C.Y., "Robust Estimation and Image Combining" Astronomical Data Analysis Software and Systems IV, ASP Conference Series, 1995 (5 pgs).
Kornai Andras et al., "Recognition of Cursive Writing on Personal Checks", Proceedings of International Workshop on the Frontiers in Handwritting Recognition, Cited in U.S. Pat. No. 7,900,822, as dated Sep. 1996, (6 pgs).
De Queiroz, Ricardo et al., "Mixed Raster Content (MRC) Model for Compound Image Compression", 1998 (14 pgs).
Rivlin, Alice M. et al., Chair, Vice Chair—Board of Governors, Committee on the Federal Reserve in the Payments Mechanism— Federal Reserve System, "The Federal Reserve in the Payments Mechanism", Jan. 1998 (41 pgs).
Tygar, J.D., Atomicity in Electronic Commerce, In ACM Networker, 2:2, Apr./May 1998 (12 pgs).
Anderson, Milton M. "FSML and Echeck", Financial Services Technology Consortium, 1999 (17 pgs).
"Full Service Direct Deposit", www.nonprofitstaffinq.com/images/upload/dirdepform.pdf. Cited in U.S. Pat. No. 7,900,822, as dated 2001, (2 pgs).
Craig, Ben, "Resisting Electronic Payment Systems: Burning Down the House?", Federal Reserve Bank of Cleveland, Jul. 1999 (4 pgs).
Rose, Sarah et al., "Best of the We: The Top 50 Financial Websites", Money, New York, Dec. 1999, vol. 28, Iss. 12 (8 pgs).
Furst, Karen et al., "Internet Banking: Developments and Prospects", Economic and Policy Analysis Working Paper 2000-9, Sep. 2000 (60 pgs).
"Middleware", David E. Bakken, Encyclopedia of Distributed Computing, Kluwer Academic Press, 2001 (6 pgs).
Palacios, Rafael et al., "Automatic Processing of Brazilian Bank Checks". Cited in U.S. Pat. No. 7,900,822, as dated 2002 (28 pgs).
Wallison, Peter J., "Wal-Mart Case Exposes Flaws in Banking-Commerce Split", American Banker, vol. 167. No. 8, Jan. 11, 2002 (3 pgs).
Heckenberg, D. "Using Mac OS X for Real-Time Image Processing" Oct. 8, 2003 (15 pgs).
Burnett, J. "Depository Bank Endorsement Requirements," BankersOnline.com, http://www.bankersonline.com/cgi-bin/printview/printview.pl, Jan. 6, 2003 (3 pgs).
Blafore, Bonnie "Lower Commissions, Fewer Amenities", Better Investing, Madison Heights: Feb. 2003, vol. 52, Iss 6, (4 pgs).
"Direct Deposit Authorization Form", www.umass.edu/humres/library/DDForm.pdf, May 2003.
"Electronic Billing Problem: The E-check is in the mail" American Banker—vol. 168, No. 95, May 19, 2003 (4 pgs).
Oxley, Michael G. from committee on Financial Services; "Check Clearing for the $21^{st}$ Century Act", $108^{th}$ Congress, $1^{st}$ Session House of Representatives report 108-132, Jun. 2003 (20 pgs).
Shelby, Hon. Richard C. (Committee on Banking, Housing and Urban Affairs); "Check Truncation Act of 2003", calendar No. 168, $108^{th}$ Congress, $1^{st}$ Session Senate report 108-79, Jun. 2003 (27 pgs).
Knestout, Brian P. et al., "Banking Made Easy" Kiplinger's Personal Finance Washington, Jul. 2003, vol. 57, Iss 7 (5 pgs).
Oxley, Michael G., from the committee of conference; "Check Clearing for the $21^{st}$ Century Act" $108^{th}$ Congress, $1^{st}$ Session Senate report 108-291, Oct. 1, 2003 (27 pgs).
Public Law 108-100, 108 Congress; "An Act Check Clearing for the $21^{st}$ Century Act", Oct. 28, 2003, 117 STAT. 1177 (18 pgs).
Johnson, Jennifer J., Secretary of the Board; Federal Reserve System, 12 CFR Part 229, Regulation CC; Docket No. R 1176, "Availability of Funds and Collection of Checks". Cited in U.S. Pat. No. 7,900,822, as dated 2009, (89 pgs).
Mohl, Bruce, "Banks Reimbursing ATM Fee to Compete With Larger Rivals", Boston Globe, Boston, MA, Sep. 19, 2004 (3 pgs).
The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in U.S. Pat. No. 7,900,822, as dated Dec. 2005 (3 pgs).
"Two Words Every Business Should Know: Remote Deposit," Canon, http:www.rpsolutions.com/rpweb/pdfs/canon_rdc.pdf, 2005 (7 pgs).
Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).
Constanzo, Chris, "Remote Check Deposit: Wells Captures a New Checking Twist", Bank Technology News Article—May 2005, www.americanbanker.com/btn_article.html?id=20050502YQ5OFSYG (2 pgs).
German Shegalov, Diplom-Informatiker, "Integrated Data, Message, and Process Recovery for Failure Masking in Web Services", Dissertation Jul. 2005 (146 pgs).
Credit Union Journal, "AFCU Averaging 80 DepositHome Transactions Per Day", Credit Union Journal, Aug. 15, 2005 (1 pg).

(56) References Cited

OTHER PUBLICATIONS

Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Cited in U.S. Pat. No. 7,873,200, as dated Dec. 2005 (20 pgs).
BankServ, "DepositNow: What's the difference?" Cited in U.S. Pat. No. 7,970,677, as dated 2006, (4 pgs).
BankServ, Product Overview, http://www.bankserv.com/products/remotedeposit.htm, Cited in U.S. Pat. No. 7,970,677, as dated 2006, (3 pgs).
Blue Mountain Consulting, from URL: www.bluemontainconsulting.com, Cited in U.S. Pat. No. 7,900,822, as dated Apr. 26, 2006 (3 pgs).
Remotedepositcapture, URL:www.remotedepositcapture.com, Cited in U.S. Pat. No. 7,900,822, as dated 2006 (5 pgs).
Onlinecheck.com/Merchant Advisors, "Real-Time Check Debit", Merchant Advisors: Retail Check Processing Check Conversion, http://www.onlinecheck/wach/rcareal.htm, Cited in U.S. Pat. No. 7,900,822, as dated 2006 (3 pgs).
"Compliance with Regulation CC", http./www/federalreserve.gov/Pubs/regcc/regcc.htm, Jan. 24, 2006 (6 pgs).
Chiang, Chuck, The Bulletin, "Remote banking offered", http://bendbulletin.com/apps/pbcs.dll/article?AID=/20060201/BIZ0102/602010327&templ . . . Feb. 1, 2006 (2 pgs).
Federal Reserve Board, "Check Clearing for the 21$^{st}$ Century Act", FRB, http://www.federalreserve.gov/paymentsystems/truncation/, Mar. 1, 2006 (1 pg).
Fest, Glen., "Patently Unaware" Bank Technology News, Apr. 2006, Retrieved from the internet at URL:http://banktechnews.com/article.html?id=2006403T7612618 (5 pgs).
Bank Systems & Technology, Untitled Article, May 1, 2006, http://www.banktech.com/showarticle.jhtml?articleID=187003126, "Are you Winning in the Payment World?" (4 pgs).
Digital Transactions News, "An ACH-Image Proposal for Check Roils Banks and Networks" May 26, 2006 (3 pgs).
RemoteDepositCapture.com, Remote Deposit Capture News Articles from Jul. 6, 2006, "BankSery Announces New Remote Deposit Product Integrated with QuickBooks" (3 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
Dias, Danilo et al., "A Model for the Electronic Representation of Bank Checks", Brasilia Univ. Oct. 2006 (5 pgs).
"Check Fraud: A Guide to Avoiding Losses", All Net, http://all.net/books/audit/checkfraud/security.htm, Cited in U.S. Pat. No. 7,900,822, as dated 2007 (1 pg).
"What is check Fraud", National Check Fraud Center, http://www.ckfraud.org/ckfraud.html , Cited in U.S. Pat. No. 7,900,822, as dated 2007 (12 pgs).
"Remote Deposit" National City, http://www.nationalcity.com/smallbusiness/cashmanagement/remotedeposit/default.asp; Cited in U.S. Pat. No. 7,900,822, as dated 2007 (1 pg).
"Remote Deposit Capture", Plante & Moran, http://planternoran.com/industries/fincial/institutions/bank/resources/community+bank+advisor/2007+summer+issue/remote+deposit+capture.htm, Cited in U.S. Pat. No. 7,900,822, as dated 2007 (3 pgs).
"Virtual Bank Checks", Morebusiness.com, http://www.morebusiness.com/running_yourbusiness/businessbits/d908484987.brc, Cited in U.S. Pat. No. 7,900,822, as dated 2007 (3 pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).
"It's the easiest way to Switch banks", LNB, http://www.inbky.com/pdf/LNBswitch-kit10-07.pdf Cited in U.S. Pat. No. 7,996,316, as dated 2007 (7 pgs).
"Lesson 38—More Bank Transactions", Turtle Soft, http://www.turtlesoft.com/goldenseal-software-manual.lesson38.htm, Cited in U.S. Pat. No. 7,900,822, as dated 2007 (8 pgs).

"Personal Finance", PNC, http://www.pnc.com/webapp/unsec/productsandservice.do?sitearea=/PNC/home/personal/account+services/quick+switch/quick+switch+faqs, Cited in U.S. Pat. No. 7,900,822, as dated 2007.
"Switching Made Easy," Bank of North Georgia, http://www.banknorthoeorgia.com/cmsmaster/documents/286/documents616.pdf, 2007 (7 pgs).
"Chapter 7 Payroll Programs," Uniform Staff Payroll System, http://www2.oecn.k12.oh.us/www/ssdt/usps/usps_user_guide_005.html, Cited in U.S. Pat. No. 7,900,822, as dated 2007 (9 pgs).
"Check 21 Solutions," Columbia Financial International, Inc. http://www.columbiafinancial.us/check21/solutions.htm, Cited in U.S. Pat. No. 7,900,822, as dated 2007 (8 pgs).
"Direct Deposit," University of Washington, http://www.washington.edu/admin/payroll/directdeposit.html, Cited in U.S. Pat. No. 7,900,822, as dated 2007 (3 pgs).
"Accept "Customer Not Present" Checks," Accept Check Online, http://checksoftware.com, Cited in U.S. Pat. No. 7,900,822, as dated 2007 (1 pg).
"Customer Personalized Bank Checks and Address Labels" Checks Your Way Inc., http://www.checksyourway.com/htm/web_pages/faq.htm, Cited in U.S. Pat. No. 7,900,822, as dated 2007 (6 pgs).
"Direct Deposit Application for Payroll", Purdue University, Business Office Form 0003, http://purdue.edu/payroll/pdf/directdepositapplication.pdf, Jul. 2007 (2 pgs).
"Frequently Asked Questions" Bank of America, http://www/bankofamerica.com/deposits/checksave/index.cfm?template-lc_faq_bymail, Cited in U.S. Pat. No. 7,900,822, as dated 2007 (2 pgs).
"Refractive index" Wikipedia, the free encyclopedia; http://en.wikipedia.org./wiki/refractiveindex.com Oct. 16, 2007 (4 pgs).
Patterson, Scott "USAA Deposit@Home—Another WOW moment for Net Banking". NextCU.com, Jan. 26, 2007 (5 pgs).
Remotedepsitcapture.com, LLC, "Remote Deposit Capture Overview," ROC Overview, http://remotedepositcapture.com/overview/RDC_overview.htm, Cited in U.S. Pat. No. 7,900,822, as dated Mar. 12, 2007 (4 pgs).
Board of Governors of the federal reserve system, "Report to the Congress on the Check Clearing for the 21$^{st}$ Century Act of 2003" Apr. 2007, Submitted to Congress pursuant to section 16 of the Check Clearing for the 21$^{st}$ Century Act of 2003, (59 pgs).
Image Master, "Photo Restoration: We specialize in digital photo restoration and photograph repair of family pictures", http://www.imphotorepair.com, Cited in U.S. Pat. No. 7,900,822, as downloaded Apr. 2007 (1 pg).
"Save on ATM Fees", RedEye Edition, Chicago Tribune, Chicago, IL Jun. 30, 2007 (2 pgs).
Associate of German Banks, SEPA 2008: Uniform Payment Instruments for Europe, Berlin, Cited in U.S. Pat. No. 7,900,822, as dated Jul. 2007, Bundesverbankd deutscher banker ev (42 pgs).
Affinity Federal Credit Union, "Affinity Announces Online Deposit," Aug. 4, 2005 (1 pg).
"Check 21—The check is not in the post", RedTitan Technology 2004 http://www.redtitan.com/check21/htm (3 pgs).
Hartly, Thomas, "Banks Check Out New Image", Business First, Buffalo: Jul. 19, 2004, vol. 20, Issue 43, (3 pgs).
Wade, Will, "Early Notes: Updating Consumers on Check 21" American Banker Aug. 10, 2004 (3 pgs).
Office Action from corresponding U.S. Appl. No. 11/877,335 dated Sep. 30, 2008 (12 pgs).
Office Action from corresponding U.S. Appl. No. 11/877,335 dated Jun. 24, 2009 (21 pgs).
Office Action from corresponding U.S. Appl. No. 11/877,335 dated May 14, 2010 (22 pgs).
Office Action from corresponding U.S. Appl. No. 11/877,335 dated Sep. 14, 2010 (28 pgs).
Office Action from corresponding U.S. Appl. No. 11/877,335 dated Apr. 25, 2011 (30 pgs).
Office Action from corresponding U.S. Appl. No. 11/877,335 dated Nov. 9, 2011 (10 pgs).
Office Action from corresponding U.S. Appl. No. 11/877,404 dated Oct. 1, 2008 (11 pgs).

(56) References Cited

OTHER PUBLICATIONS

Office Action from corresponding U.S. Appl. No. 11/877,404 dated May 28, 2009 (16pgs).
Office Action from corresponding U.S. Appl. No. 11/877,404 dated May 14, 2010 (23pgs).
Office Action from corresponding U.S. Appl. No. 11/877,404 dated Sep. 10, 2010 (27pgs).
Office Action from corresponding U.S. Appl. No. 11/877,404 dated Apr. 27, 2011 (33pgs).
Office Action from corresponding U.S. Appl. No. 11/877,367 dated Oct. 2, 2008 (14 pgs).
Office Action from corresponding U.S. Appl. No. 11/877,367 dated Jun. 23, 2009 (24 pgs).
Office Action from corresponding U.S. Appl. No. 11/877,367 dated Dec. 7, 2009 (47 pgs).
Office Action from corresponding U.S. Appl. No. 11/877,367 dated May 13, 2010 (48 pgs).
Office Action from corresponding U.S. Appl. No. 11/877,367 dated Apr. 29, 2011 (75 pgs).
Office Action from corresponding U.S. Appl. No. 11/877,367 dated Nov. 9, 2011 (9 pgs).
Office Action from corresponding U.S. Appl. No. 11/877,335 dated Jan. 18, 2012 (20 pgs).
U.S. Appl. No. 11/320,998, filed Dec. 29, 2005, Luby et al.
U.S. Appl. No. 11/321,025, filed Dec. 29, 2005, Luby et al.
U.S. Appl. No. 11/321,027, filed Dec. 29, 2005, Luby et al.
U.S. Appl. No. 11/591,131, filed Oct. 31, 2006, Luby et al.
U.S. Appl. No. 11/591,014, filed Oct. 31, 2006, Oaks et al.
U.S. Appl. No. 11/590,971, filed Oct. 31, 2006, Oaks et al.
U.S. Appl. No. 11/591,247, filed Oct. 31, 2006, Oaks et al.
U.S. Appl. No. 11/590,963, filed Oct. 31, 2006, Oaks et al.
U.S. Appl. No. 11/591,025, filed Oct. 31, 2006, Oaks et al.
U.S. Appl. No. 11/591,003, filed Oct. 31, 2006, Oaks et al.
U.S. Appl. No. 11/591,974, filed Oct. 31, 2006, Oaks et al.
U.S. Appl. No. 11/591,273, filed Oct. 31, 2006, Walls et al.
U.S. Appl. No. 11/591,262, filed Oct. 31, 2006, Walls et al.
U.S. Appl. No. 11/591,227, filed Oct. 31, 2006, Walls et al.
U.S. Appl. No. 11/591,261, filed Oct. 31, 2006, Walls et al.
U.S. Appl. No. 11/590,998, filed Oct. 31, 2006, Walls et al.
U.S. Appl. No. 11/591,228, filed Oct. 31, 2006, Walls et al.
U.S. Appl. No. 11/591,320, filed Oct. 31, 2006, Walls et al.
"Adjusting Brightness and Contrast", www.eaglesoftware.com/adjustin.htm, retrieved on May 4, 2009 (4 pgs).
"Best practices for producing quality digital image files," Digital Images Guidelines, http://deepblue.lib.umich.edu/bitstream/2027.42/40247/1/Images-Best_Practice.pdf, downloaded 2007, 2 pgs.
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008, 2 pgs.
"Mitek Systems Announces Mobile Deposit Application for Apple iPhone," http://prnewswire.com/cgi-bin/stories/pl?ACCT=104&STORY</www/story/10-01- . . . , Nov. 25, 2008 (2 pgs).
"WallStreetGrapevine.com" Stocks on the Rise: JADG, BKYI, MITK; Mar. 3, 2008 (4 pgs).
Albrecht, W. Steve, "Check Kiting: Detection, Prosecution and Prevention," The FBI Law Enforcement Bulletin, Nov. 1, 1993 (6pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Amber Avalona-Butler / Paraglide, At Your Service: Best iPhone Apps for Military Lifestyle, Jul. 9, 2010 (2 pgs).
Automated Merchant Systems, Inc., "Electronic Check Conversion," http://www.automatedmerchant.com/electronic_check_conversion.cfm, 2006, downloaded Oct. 18, 2006, 3 pgs.
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 18, 2008 (5 pgs).
Bruene, Jim; "Check Free to Enable In-Home Remote Check Deposit for Consumers and Small Business", NetBanker. Com, Financial Insite, Inc., http://www.netbanker.com/2008/02/checkfree_to_enableinhome_rem.html, Feb. 5, 2008 (3 pgs).
Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).
Carrubba, P. et al., "Remote Deposit Capture: A White Paper Addressing Regulatory, Operational and Risk Issues," NetDeposit Inc., 2006 (11 pgs).
Century Remote Deposit High-Speed Scanner User's Manual Release 2006, (Century Manual), Century Bank, 2006, (32 pgs).
Check Image Group Outlines Agenda Daniel Wolfe, American Banker, New York, N.Y.: Feb. 13, 2009. vol. 174, Iss. 30, p. 12.
CNN.com/technology, "Scan, deposit checks from home", www.cnn.com/2008ITECH/biztech/02/07/check.scanning.ap/index.html, Feb. 7, 2008 (3 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).
Credit Union Journal, "The Ramifications of Remote Deposit Capture Success", www.cuijournal.com/orintthis.html?id=20080411EODZT57G, Apr. 14, 2008 (1 pg).
DCU Member's Monthly—Jan. 2008, "PC Deposit—Deposit Checks from Home!", http://www.mycreditunionnewsletter.com/dcu/01 08/page1. html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
Debello, James et al., "RDM and Mitek Systems to Provide Mobile Check Deposit," Mitek Systems, Inc., San Diego, California and Waterloo, Ontario, (Feb. 24, 2009), 2 pgs.
DeYoung, Robert; "The Financial Performance of Pure Play Internet Banks"; Federal Reserve Bank of Chicago Economic Perspectives; 2001; pp. 60-75; vol. 25, No. 1 (16pgs).
eCU Technologies, "Upost Remote Deposit Solution," Retrieved from the internet https://www.eutechnologies.com/products/upost.html, downloaded 2009, 1 pg.
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006, 3 pgs.
Federal Reserve System, "12 CFR, Part 229 [Regulation CC; Docket No. R-0926]: Availability of Funds and Collection of Checks," Federal Registrar, Apr. 28, 1997, pp. 1-50.
Federal Reserve System, "Part IV, 12 CFR Part 229 [Regulation CC; Docket No. R-1176]: Availability of Funds and Collection of Checks; Final Rule," Federal Registrar, vol. 69, No. 149, Aug. 4, 2004, pp. 47290-47328.
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Garry, M., "Checking Options: Retailers face an evolving landscape for electronic check processing that will require them to choose among several scenarios," Supermarket News, vol. 53, No. 49, 2005 (3 pgs).
Gupta, Maya R. et al., "OCR binarization and image pre-processing for searching historical documents," Pattern Recognition, vol. 40, No. 2, Feb. 2007, pp. 389-397.

(56) References Cited

OTHER PUBLICATIONS

Hale, J., "Picture this: Check 21 uses digital technology to speed check processing and shorten lag time," Columbus Business First, http://columbus.bizjournals.com/columbus/stories/2005/03/14focus1.html, downloaded 2007, 3 pgs.
Hildebrand, C. et al., "Electronic Money," Oracle, http://www.oracle.com/oramag/profit/05-feb/p15financial.html, 2005, downloaded Oct. 18, 2006, 5 pages.
Hillebrand, G, "Questions and Answers About the Check Clearing for the 21st Century Act, Check 21," ConsumersUnion.org, http://www.consumersunion.org/finance/ckclear1002.htm, Jul. 27, 2004, downloaded Oct. 18, 2006, 6 pgs.
Investment Systems Company, "Portfolio Accounting System," 2000, pp. 1-32.
JBC, "What is a MICR Line?," eHow.com, retrieved from http://www.ehow.com/about_4684793_what-micr-line.html on May 4, 2009 (2 pgs).
Kendrick, Kevin B., "Check Kiting, Float for Purposes of Profit," Bank Security & Fraud Prevention, vol. 1, No. 2, 1994, 3 pgs.
Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).
Levitin, Adam J., Remote Deposit Capture: A Legal and Transactional Overview, Banking Law Journal, p. 115, 2009 (RDC).
Matthews, Deborah, "Advanced Technology Makes Remote Deposit Capture Less Risky," Indiana Bankers Association, Apr. 2008, 2 pgs.
Metro 1 Credit Union, "Remote Banking Services," http://ww.\\i.metro1cu.org/metro1cu/remote.html, downloaded Apr. 17, 2007, 4 pgs.
Mitek systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/mi_qa3799/is200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fisery Research Finds Banks are Interested in Offering Mobile Deposit Capture as an," Fiserv, Inc. Brookfield, Wis., (Business Wire), (Feb. 20, 2009), 2 pages.
Online Deposit: Frequently Asked Questions, http://www.depositnow.com/faq.html, Copyright 2008 (1 pg).
Rao, Bharat; "The Internet and the Revolution in Distribution: A Cross-Industry Examination"; Technology in Society; 1999; pp. 287-306; vol. 21, No. 3 (20 pgs).
Richey, J. C. et al., "EE 4530 Check Imaging," Nov. 18, 2008 (10 pgs).
SoyBank Anywhere, "Consumer Internet Banking Service Agreement," Dec. 6, 2004 (6 pgs).
Teixeira, D, "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html (2 pgs).
The Green Sheet 2.0: Newswire, "CO-OP adds home deposit capabilities to suite of check imaging products", www.greensheet.com/newswire.php?newswire_id=8799, Mar. 5, 2008 (2 pgs).
Valentine, Lisa, "Remote Deposit Capture Hot Just Got Hotter," ABA Banking Journal, Mar. 2006, p. 1-9.

Wells Fargo Commercial, "Remote Deposit", www.wellsfargo.com/com/treasurymgmtlreceivables/electronic/remote_deposit, Copyright 2008 (1 pg).
Whitney et al., "Reserve Banks to Adopt DSTU X9.37-2003 Format for Check 21 Image Services", American Bankers Association, May 18, 2004, http://www.aba/com/NR/rdonlyres/CBDC1_A5C-43E3-43CC-B733-BE417C638618/35930/DSTUFormat.pdf (2 pgs).
Wikipedia ®, "Remote Deposit," http://en.wikipedia.org/wiki/Remote_deposit, 2007 (3 pgs).
Windowsfordevices.com, "Software lets camera phone users deposit checks, pay bills", www.windowsfordevices.com/news/NS3934956670.html, Jan. 29, 2008 (3 pgs).
Woody Baird Associated Press, "Pastor's Wife got Scammed—She Apparently Fell for Overseas Money Scheme," The Commercial Appeal, Jul. 1, 2006, p. A. 1.
Zions Bancorporation, "Moneytech, the technology of money in our world: Remote Deposit," http://www.bankjunior.com/pground/moneytech/remote_deposit.jsp, 2007 (2 pgs).
Final Office Action from corresponding U.S. Appl. No. 11/877,307 dated Jun. 10, 2009 (20 pgs).
Final Office Action from corresponding U.S. Appl. No. 11/877,307 dated May 13, 2010 (31 pgs).
Office Action from corresponding U.S. Appl. No. 11/877,307 dated Apr. 25, 2011 (39 pgs).
Office Action from corresponding U.S. Appl. No. 11/877,307 dated Dec. 8, 2009 (29 pgs).
Office Action from corresponding U.S. Appl. No. 11/877,307 dated Sep. 26, 2008 (13 pgs).
"Remote check deposit is the answer to a company's banking problem," Daily Breeze, Torrance, CA, Nov. 17, 2006, 2 pgs.
"SNB Check Capture: SmartClient User's Guide," Nov. 2006, 21 pgs.
Credit Union Management, "When You wish Upon an Imaging System . . . The Right Selection Process can be the Shining Star," Credit Union Management, Aug. 1993, printed from the internet at <http://search.proquest.com/docview/227756409/14138420743684F7722/15?accountid=14 . . . >, on Oct. 19, 2013 (11 pgs).
Doermann, David et al., "Progress in Camera-Based Document Image Analysis," Proceedings of the Seventh International Conference on Document Analysis and Recognition (ICDAR 2003) 0-7695-1960-1/03, 2003 IEEE (11 pages).
Duvall, Mel, "Remote Deposit Capture," Baseline, vol. 1, Issue 70, Mar. 2007, 2 pgs.
Herley, Cormac, "Efficient Inscribing of Noisy Rectangular Objects in Scanned Images," 2004 International Conference on Image Processing, 4 pages.
Iida, Jeanne, "The Back Office: Systems—Image Processing Rolls on as Banks ReapBenefits," American Banker, Jul. 19, 1993, printed from the internet at <http://search.proquest.com/docview/292903245/14138420743684F7722/14?accountid=14 . . . >, on Oct. 19, 2013 (3 pgs).
Application as filed Dec. 29, 2005 for U.S. Appl. No. 11/321,025 (19 pgs).
Application as filed Feb. 15, 2012 for U.S. Appl. No. 13/397,405 (19 pgs).
Application as filed Jan. 7, 2013 for U.S. Appl. No. 13/735,678 (30 pgs).
Application as filed Mar. 15, 2013 for U.S. Appl. No. 13/842,112 (62 pgs).
Application as filed Oct. 17, 2013 for U.S. Appl. No. 14/056,565 (53 pgs).
Application as filed Oct. 8, 2007 for U.S. Appl. No. 11/868,878 (30 pgs).
Claims as filed Apr. 1, 2013 for U.S. Appl. No. 13/854,521 (5 pgs).
Claims as filed Apr. 30, 2013 for U.S. Appl. No. 13/874,145 (5 pgs).
Claims as filed Aug. 21, 2009 for U.S. Appl. No. 12/545,127 (5 pgs).
Claims as filed Dec. 20, 2012 for U.S. Appl. No. 13/722,576 (4 pgs).
Claims as filed Dec. 29, 2005 for U.S. Appl. No. 11/320,998 (3 pgs).
Claims as filed Dec. 29, 2005 for U.S. Appl. No. 11/321,027 (3 pgs).
Claims as filed Feb. 12, 2013 for U.S. Appl. No. 13/765,412 (1 pg).
Claims as filed Feb. 15, 2012 for U.S. Appl. No. 13/397,437 (6 pgs).

(56) References Cited

OTHER PUBLICATIONS

Claims as filed Feb. 16, 2015 for U.S. Appl. No. 14/623,179 (10 pgs).
Claims as filed Feb. 19, 2013 for U.S. Appl. No. 13/770,048 (4 pgs).
Claims as filed Feb. 3, 2016 for U.S. Appl. No. 15/014,918 (5 pgs).
Claims as filed Jun. 12, 2015 for U.S. Appl. No. 14/738,340 (4 pgs).
Claims as filed Jun. 13, 2012 for U.S. Appl. No. 13/495,971 (36 pgs).
Claims as filed Jun. 20, 2013 for U.S. Appl. No. 13/922,686 (7 pgs).
Claims as filed Jun. 9, 2014 for U.S. Appl. No. 14/299,456 (36 pgs).
Claims as filed Mar. 20, 2014 for U.S. Appl. No. 14/220,799 (1 pg).
Claims as filed Mar. 25, 2014 for U.S. Appl. No. 14/224,944 (4 pgs).
Claims as filed Mar. 25, 2014 for U.S. Appl. No. 14/225,090 (1 pg).
Claims as filed Mar. 3, 2014 for U.S. Appl. No. 14/195,482 (4 pgs).
Claims as filed Nov. 20, 2012 for U.S. Appl. No. 13/682,268 (4 pgs).
Claims as filed Oct. 16, 2014 for U.S. Appl. No. 14/516,335 (4 pgs).
Claims as filed Oct. 16, 2014 for U.S. Appl. No. 14/516,350 (4 pgs).
Claims as filed Oct. 16, 2014 for U.S. Appl. No. 14/516,364 (4 pgs).
Claims as filed Oct. 31, 2006 for U.S. Appl. No. 11/591,131 (4 pgs).
Claims as filed Sep. 14, 2012 for U.S. Appl. No. 13/619,026 (3 pgs).
Final Office Action from corresponding U.S. Appl. No. 11/877,335, dated Sep. 17, 2015 (9 pgs).
Office Action from corresponding U.S. Appl. No. 11/877,335 dated Jan. 2, 2015 (11 pgs).
Notice of Allowance from corresponding U.S. Appl. No. 13/327,478 dated Sep. 8, 2015 (11 pgs).
Notice of Allowance from corresponding U.S. Appl. No. 13/327,478 dated Jan. 12, 2015 (14 pgs).
Office Action from corresponding U.S. Appl. No. 13/327,478 dated Jul. 16, 2014 (13 pgs).

\* cited by examiner

SYSTEMS AND METHODS FOR OBTAINING AN IMAGE OF A CHECK TO BE DEPOSITED

CROSS-REFERENCE TO RELATED APPLICATIONS

This application is related by subject matter to the following commonly assigned applications, the entirety of which are hereby incorporated by reference herein: U.S. patent application Ser. No. 11/877,307, U.S. patent application Ser. No. 11/877,335, U.S. patent application Ser. No. 11/877,367, and U.S. patent application Ser. No. 11/877,404, each filed on Oct. 23, 2007, and each entitled "Systems and methods for obtaining an image of a check to be deposited".

BACKGROUND

A check is a negotiable instrument. Formally, a check is an order that a "drawer" (the party who writes the check, and from whose bank account the money is to be drawn) issues to a "drawee bank" (the bank at which the drawer's money is located), and the order instructs the drawee bank to pay a "payee" (the party to whom the check is written). A check is negotiated by the payee's presenting the check to the drawee bank. The presentment process is normally initiated by the payee's bank, which presents the check to the drawee bank when the payee deposits the check with his or her bank.

Presentment of a check is normally done through the Federal Reserve or a commercial banking system. Traditionally, the mechanism by which this presentment occurs is by tendering the paper check through the banking system. The paper check is physically transmitted to the drawee bank, which either accepts and pays the paper check upon receipt, or declines payment and returns the paper check. Technological and legal developments, such as procedures set forth in the Check-21 law, allow images of checks (sometimes referred to as "substitute checks") to be presented electronically without presentment of a paper copy. Thus, starting the presentment process may involve collecting an image of the check rather than obtaining the original paper check. Check scanners have traditionally been available to read the Magnetic Ink Character Recognition (MICR) line at the bottom of the check, and this information can be used for presentment. However, it is possible to present an ordinary image of a check, where the image is collected with ordinary image scanning equipment.

A customer can take the paper check to a bank for deposit and have the bank scan the check to obtain an image. However, it is also possible to collect the image of the check from the customer who is depositing the check.

SUMMARY

An image of a check to be presented for payment can be collected from a banking customer using the customer's scanning equipment. The customer can scan the check into one or more files (e.g., one file for the front, a second file for the back). The files can then be uploaded to a server operated by the customer's bank, and the images contained in the files can be presented through the banking system for payment by the drawee bank.

The customer's bank may operate software, such as software provided on a web site, that guides the customer through the process of obtaining the check images. For example, the customer may visit the bank's web site, and the web site may instruct the customer to obtain images of both sides of the check, may instruct the customer how to position the check in the scanner, may instruct the customer as to what image format and/or resolution to use, etc. The web site may also guide the user through the process of delimiting the boundary of the check, such as by identifying a corner of the check. The bank's software can also perform certain verifications on the check, such as verifying the check against legibility and/or size standards, verifying that there is an endorsement on the back of the check, verifying that the amount of money written on the check matches the amount that the customer has indicated in a deposit request, etc.

This summary is provided to introduce a selection of concepts in a simplified form that are further described in the detailed description. This summary is not intended to identify key features or essential features of the claimed subject matter, nor is it intended to be used to limit the scope of the claimed subject matter.

DETAILED DESCRIPTION

Figure 1:
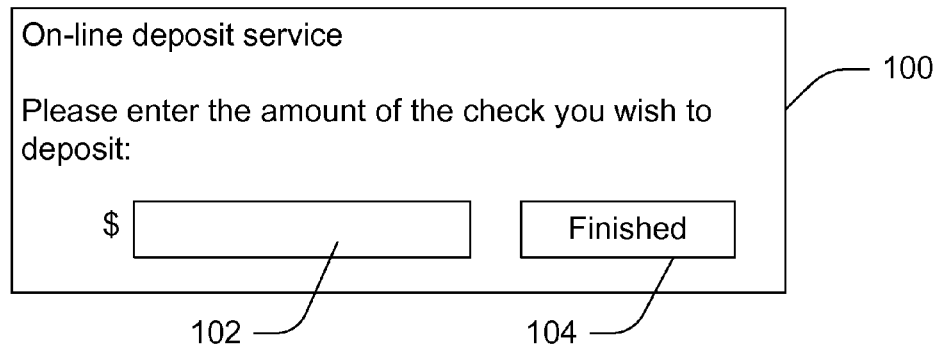
FIG. 1 is a diagram of a user interface that requests that a depositor enter an amount of a deposit.

A web site can guide a user through the process of collecting images of a check to be deposited. In some cases, the web site can provide software, such as a browser-executable applet, that drives the process of collecting images by operating the customer's scanner. For example, after the customer enters an amount of a check to be deposited, the software provided on the web site can instruct the user to place the check in the scanner bed and to click a button when ready. The software can then cause the scanner to be started, can collect the image in an appropriate format and resolution, and can then upload the image for deposit. The software can repeat the process for both sides of the check, in order to obtain images of the front and the back.

Having the web site drive the image-collection process may be simple for the customer (e.g., the bank depositor who uses the web site), since the customer may not have to address issues such as what to name the file, what format or resolution to use. Having the web site drive the process also may avoid, for the customer, the process of identifying particular files to be uploaded. However, certain permissions may be used in order to allow the web site's software to operate the scanner. Scanners are normally operated by a device driver, such as a TWAIN driver. For security reasons, the driver may require certain certificates to be used before allowing a program to operate the scanner that the driver controls. Since users often transparently download programs to run in their web browsers without realizing that they are downloading programs, programs such as applets, scripts, etc., that run in web browsers often present a particular security risk, and a driver may require such a program to obtain a certificate before it allows the program to control the scanner. Each scanner (or the scanners within a brand-mate family), may have its own driver. The drivers may be different for different operating environments—e.g., the same scanner may use a different driver depending on whether it is being operated from an environment based on one of the WINDOWS operating systems, an environment based on one of the operating systems used in APPLE computers, an environment based on a version of the LINUX operating system, etc. Each driver may use different certificates. Moreover, the different environments may use various different environment-specific technologies to allow the scanner to be controlled from a remote web server. Since the bank that operates the web site does not know what scanning equipment or operating environment its customer will be using, it may need to obtain a large number of certificates, and may need to interface with a large number of different technologies, to support a large number of scanner-environment combinations, in order to allow its software to control scanners for a variety of customers.

At present, most consumers use computers whose environment is based on one of the WINDOWS operating systems. Thus, it may make sense from a cost-benefit perspective, for a bank to obtain the certificates to operate a wide variety of scanners in environments based on the WINDOWS operating systems, and to support the technology that allows the scanner to be controlled within that environment. However, it may not make sense from a cost-benefit perspective for the bank to obtain the certificates to operate lesser-used scanners, or scanners in environments other than those based on the WINDOWS operating systems. Thus, an alternative mechanism for obtaining an image of the check may be used. One example of such a mechanism is to have the customer scan an image of the check (or separate images of the front and back of the check) into a file, and then upload the file(s) to the bank's server for presentment through a banking system.

Figure 2:
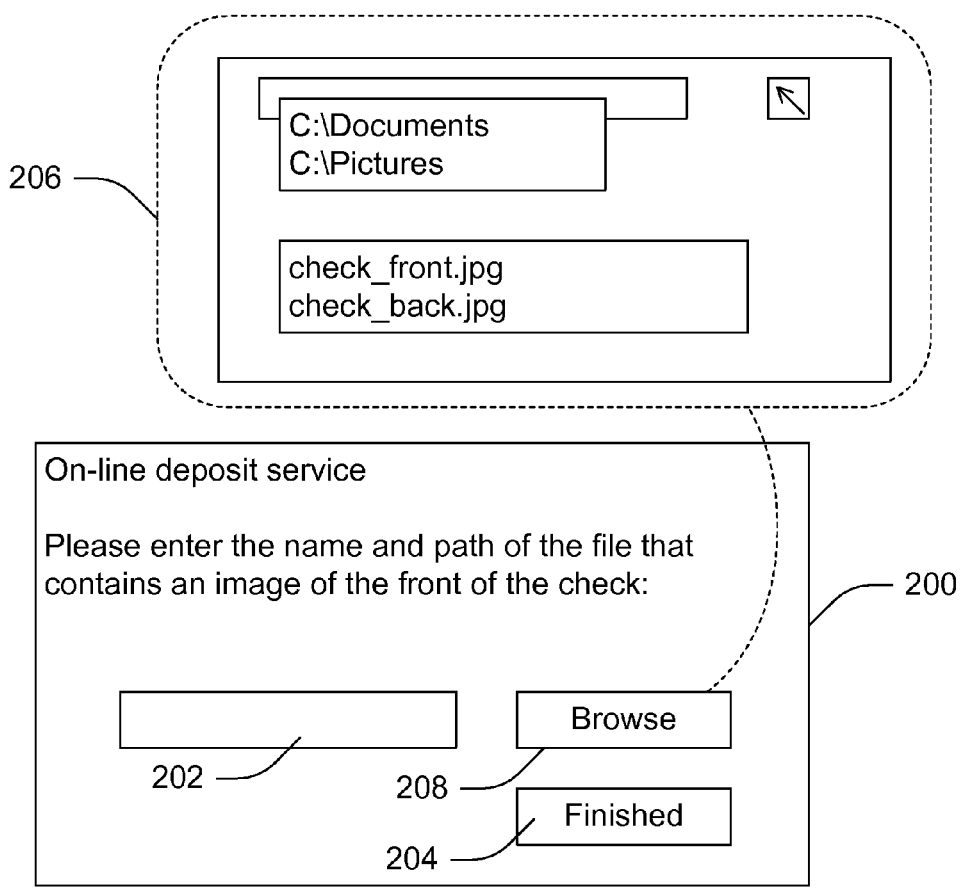
FIG. 2 is a diagram of a user interface that requests that a depositor provide an image of a first side of a check.
Figure 3:
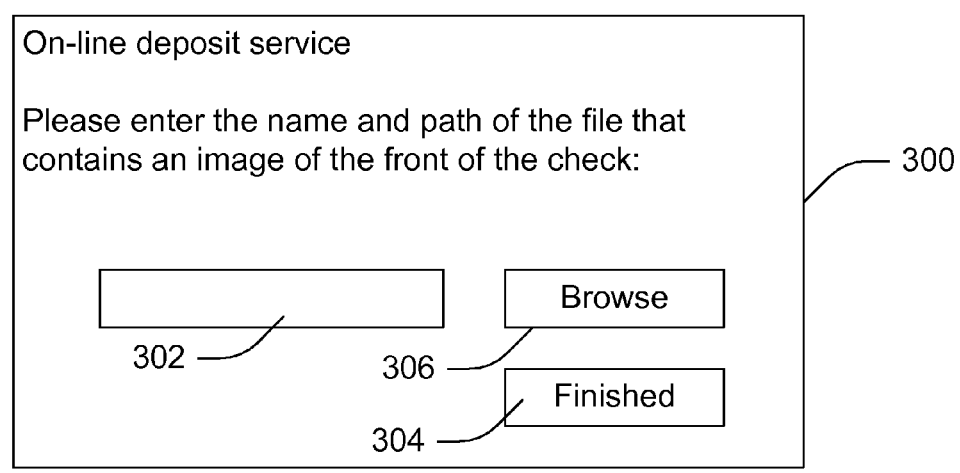
FIG. 3 is a diagram of a user interface that requests that a depositor provide an image of a second side of a check.

Turning to the drawings, FIGS. 1, 2, and 3 show examples of user interfaces that could be presented to a user in order to obtain a deposit amount and the appropriate check images. These user interfaces could be presented through a web site—e.g., by delivering to a depositor's computer or other machine, web pages that cause these user interfaces to be displayed on the depositor's browser. However, these user interfaces could be presented using any mechanism.

In FIGS. 1-3, the depositor is asked to enter an amount of a check to be deposited, and is then asked to provide scanned images of the front and back of the check. Thus, in FIG. 1, user interface 100, the depositor is requested to enter the amount of a check to be deposited into box 102. This amount can be entered in the form of text. When the depositor has entered the amount of the check to be deposited, the depositor may click button 104, indicating that he or she is "finished." FIG. 1 shows an example in which the depositor is requested to enter an amount of a single check to be deposited. However, the depositor could also be given a set of boxes to enter an arbitrary number of checks, or could be asked to enter an aggregate amount of a deposit covering several checks, or could be asked for an amount of a deposit in any other way.

FIG. 2 shows user interface 200, which requests that the depositor enter a name of a file containing an image of the front of the check to be deposited. The name, and optionally the path, of the file can be entered into box 202. When the depositor has entered the name of the file, he or she can click button 204 to indicate that he or she is "finished" entering the name. The name can be entered either by the depositor typing the name as text into box 202. Or, as another example, the depositor can be presented with a file navigation user interface 206. The depositor may click button 208 ("browse") to access file navigation user interface 206. File navigation user interface 206 may show the depositor's local and/or network folder structure, and allow the depositor to navigate through folders and files to obtain the name of the file containing the image. When the depositor has selected the name of the file, the name (or name and path) of the file may appear in box 202 as if the depositor had typed the name (or name and path). User interface 200 could also include information and/or instructions for the depositor about the rules that govern the nature of the image to be provided—e.g., text could be displayed or communicated in user interface 200 that advises the depositor as to the format of the image to be provided (e.g., JPEG), the resolution of the image (e.g., 200 dpi), other parameters (e.g., turning on grayscale for the scan), etc. As another example, the depositor could be shown examples of "good" and "bad" scans—e.g., an image could be shown to the depositor indicating an example of scan that would be accepted, and another image could be shown to the depositor indicating an example of a scan that would not be accepted. A scan that would not be accepted might be shown as being smudged, or crooked, or obscured in some manner. There are a variety of reasons for which a scan might not be accepted, and examples demonstrating any one or more of these reasons could be shown to the depositor.

FIG. 3 shows user interface 300, which is similar to user interface 200 but asks the depositor to enter the name of a file containing an image of the back of the check instead of the front. Like user interface 200, user interface 300 may have a box 302 into which the depositor can enter the name of the file containing the appropriate image, a button 304 that the depositor can click when he or she is finished entering the file name, a browse button 306 that the depositor can use to access a file navigation user interface similar to that shown in FIG. 2 and previously discussed. Additionally user interface 300 may inform and/or instruct the depositor as to issues concerning format, resolution, other parameters, etc.

Figure 4:
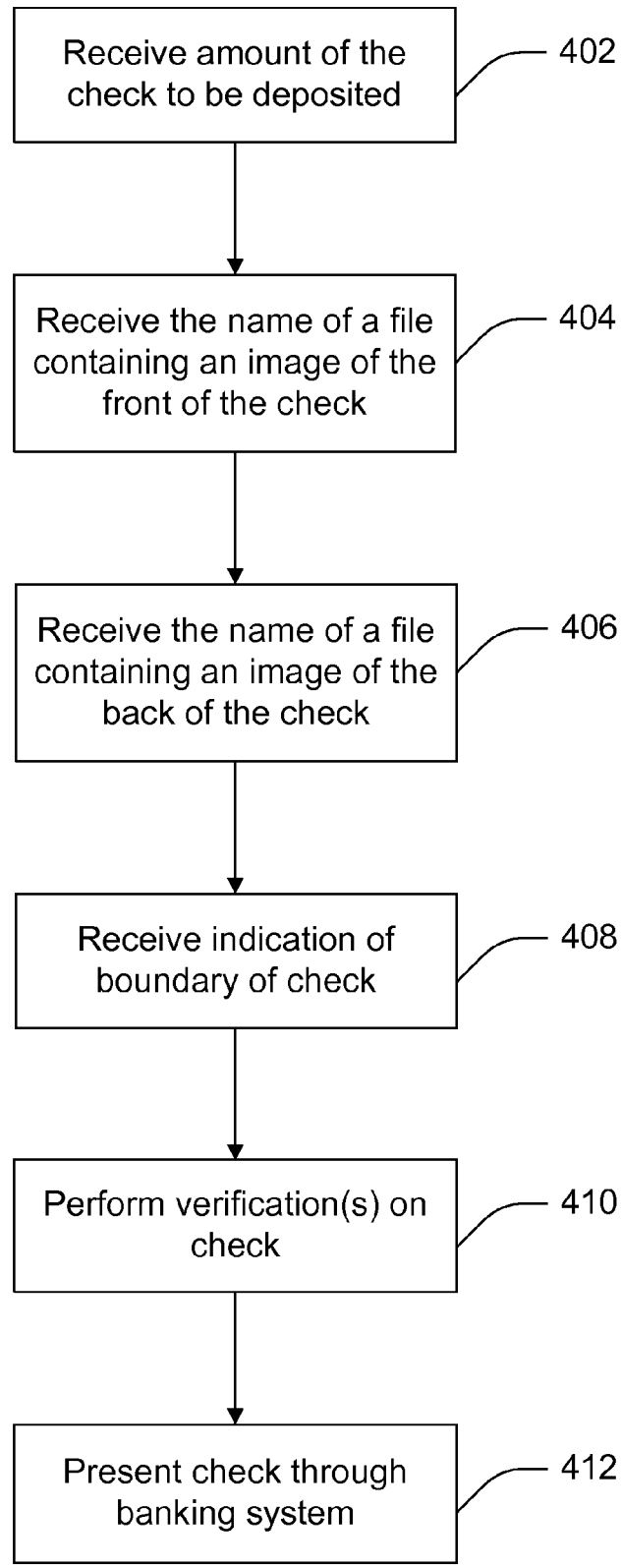
FIG. 4 is a flow diagram of an example process whereby an image of a check is received and presented for payment.
Figure 5:
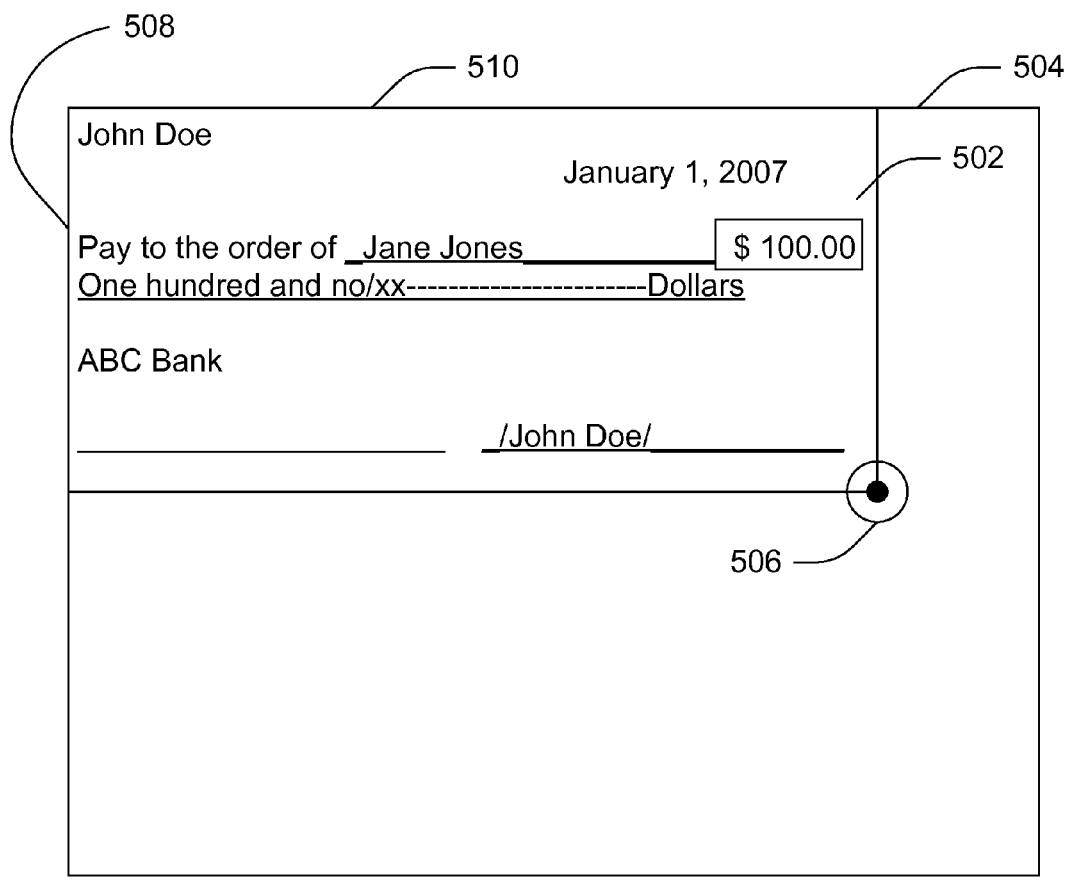
FIG. 5 is a diagram of an example user interface in which a user marks a boundary of a check.

FIG. 4 is a flow diagram of an example process whereby an image of a check is received and presented for payment. It is noted that the process of FIG. 4, as well as the process discussed subsequently in connection with FIG. 5, are both described, by way of example, with reference to a web server that interacts with a depositor by communicating through a network with a browser running on the depositor's machine. However, these processes may be carried out in any system, and are not limited to the scenarios described. Moreover, these flow diagrams show examples in which stages of a process are carried out in a particular order, as indicated by the lines connecting the blocks, but the various stages shown in these diagrams can be performed in any order, or in any combination or sub-combination.

At 402, an amount of a check to be deposited is received. For example, a user interface (such as user interface 100, shown in FIG. 1) may be used to ask a depositor for the amount of a check to be deposited. As previously noted, the depositor may be given the opportunity to enter an amount of a single check, a list of amounts for plural checks, an aggregate total amount of plural checks, etc. At least one such amount is received at 402.

At 404, a name of a file that contains an image of the front side of the check is received. For example, a user interface (such as user interface 200, shown in FIG. 2) may be used to obtain the name (or name and path) of a file that contains an image of the check. The user may have already scanned the check and placed the image in a file, or the user can be instructed to scan the check (or a side of the check) at the time that the file name is to be received. The file whose name is entered may be uploaded to a server, such as a web server operated by the bank with which the check is to be deposited.

At 406, a name of a file that contains an image of the back side of the check is received. For example, a user interface (such as user interface 300, shown in FIG. 3) may be used to obtain the name (or name and path) of a file that contains an image of the check. As with 404, the user may already have scanned the check into an image file, or can be instructed to do so. The file whose name is entered may be uploaded to a server, such as a web server operated by the bank with which the check is to be deposited.

At 408, the boundaries the check are received. For example, the user may be asked to draw a boundary on the image to indicate which part of the image is the check, and which part is merely background due to the fact that amount of area scanned is generally larger than a check. One way to obtain an indication of the location of this boundary is to ask the user to scan the check by placing the top and left edges of the check directly abutting the top and left sides of the scanner bed. Thus, the top and left edges of the boundary of the check are defined by the edges of the scanning sight. Presuming that the check is a rectangle, the bottom and right edges that define the remaining portion of the boundary can be indicated by a single point in the bottom, right corner of the check. An example of this technique is shown in FIG. 5.

FIG. 5 shows a check 502, which has been scanned. Sight 504 indicates the area that has been scanned, and it can be seen that left edge 508 and top edge 510 of check 502 abut the left and top edges of the scan sight. By placing a marker (such as dot 506) in the right, bottom corner of the check, the rectangular boundary of the check is defined. Thus, it can be determined from the position of the marker which portion of sight 504 contains an image of a side of check 502, and which portion contains background. The portion that contains the image can later be used to present the check for payment through a banking system. It is noted that the marker can be positioned through various mechanisms. For example, a web server that implements the process of collecting a deposit request and check images from a depositor can download software (e.g., a plug-in, an applet, a script, etc.) that executes in the depositor's browser and allows the depositor to position a marker such as dot 506 with a pointing device, such as a mouse, trackpad, etc. This program could be used to place the marker on the image before the image is uploaded to the bank's server. As another example, the bank's server could receive the image, and then send a copy or modified version of the image back to the depositor's web browser to be operated on the program. For example, after the upload of the image, the bank's web server could cause a new window to be opened with a page containing the image, and a script, applet, plug-in, etc., that allows the depositor to place the marker. Any mechanism to allow the depositor to place the marker could be used.

Returning to FIG. 4, certain types of verifications may be performed (at 410) on the check images that have been received. For example, the images could be verified to determine they are in an acceptable format, at an acceptable resolution, or that the amount of the check shown on the front of the check matches the amount stated by the depositor, or that the back of the check contains an endorsement, or that the check complies with size standards (or other standards) according to applicable law such as the Check-21 law. In one example, the system may check that the images are in the JPEG format, or that the images are at least 200 dpi in resolution, or that the capture of the image preserves grayscale. Resolution and/or grayscale can be addressed as part of the process of verifying that the image is in an acceptable format, or compliance with resolution and grayscale parameters could be checked separately. A comparison of the amount of the check as stated by the depositor with the amount written on the check can be performed by using optical character recognition (OCR) on the check to determine the amount that it states. Or, as another example, the check could be examined by a human and compared with the amount entered by the depositor. Similarly, the presence of an endorsement on the image of the back of the check could be detected using OCR (or some other type of image processing), or could be evaluated by a human.

Figure 7:
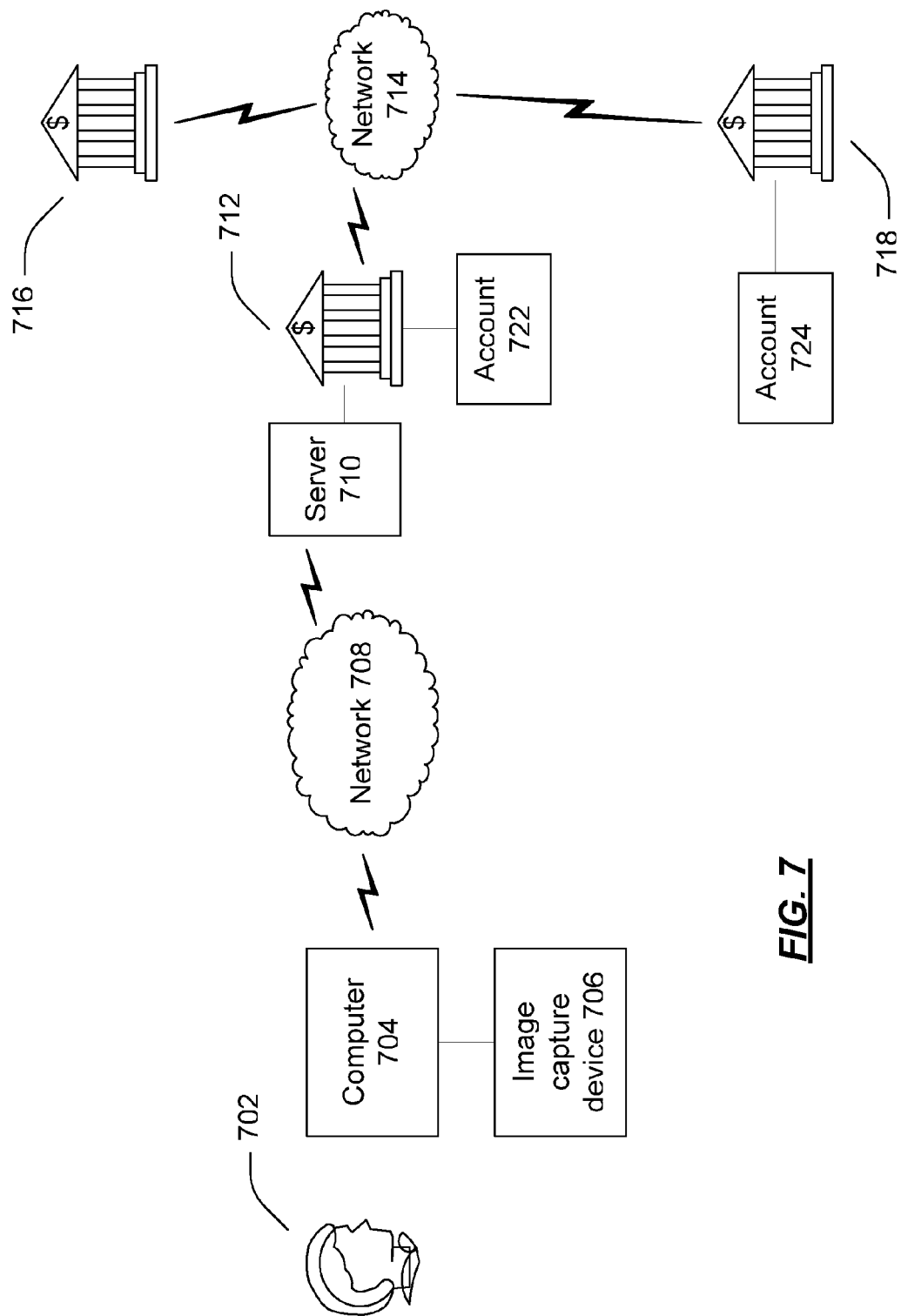
FIG. 7 is a block diagram of an example environment in which checks may be deposited and presented.

At 412, the images of the front and back of the check are presented for payment through a banking system. For example, a banking system such as the Federal Reserve or a commercial banking system may operate a server to which these images can be provided, and the images can be presented to the drawee bank through such system. An example of a banking system is shown in FIG. 7, and is discussed subsequently.

Figure 6:
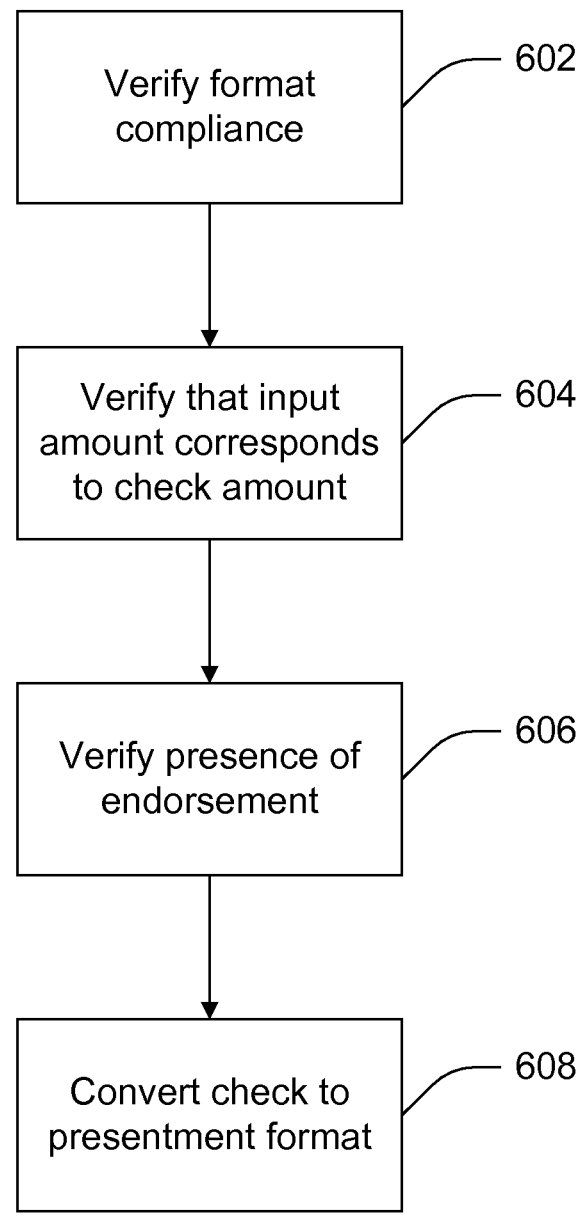
FIG. 6 is a flow diagram of various stages that can be performed after an image of a check is received by a bank from a depositor.

FIG. 6 shows an example of various stages that can be performed after an image of a check is received by a bank from a depositor. For example, when images of a check are from a depositor by the bank's web server, certain processing can be performed on the image to prepare the check for presentment through a banking system. FIG. 6 shows examples of stages of such processing. It should be noted that 602, 604, and 606, as shown in FIG. 6, provide additional detail of features that are discussed previously in connection with 410 in FIG. 4.

At 602, the files containing the image may be evaluated to determine whether they are in an appropriate format. For example, features of the images, such as file format (e.g., JPEG, GIF, TIF, etc.) may be evaluated. In one example, the depositor may be instructed to upload the images in JPEG format, and an image may be rejected if the evaluation at 602 determines that the image is in a different format. Additional features that may be evaluated include resolution of the image, the presence of grayscale, compliance with legal standards such as Check-21, etc.

At 604, a verification may be performed to determine that the amount of money written on the check corresponds to the amount of the check reported by the depositor. For example, the image of the front of the check can be evaluated by an OCR process, read by a human, etc., and this amount can be compared to the amount of the deposit as entered by the depositor.

At 606, the image of the back of the check may be evaluated to determine the presence of an endorsement. For example, an OCR process, or other type of image processing, may be performed to determine whether the image contains an endorsement. Or the image can be given to a human to evaluate for the presence of an endorsement.

At 608, the images of the check may be converted to an appropriate format for presentment through a banking system. For example, the banking system may impose certain standards such as file format, headers, metadata, etc. The images may be modified and/or packaged to comply with these standards prior to presentment of the check images through a banking system.

FIG. 7 shows an example environment in which checks may be deposited and presented. Depositor 702 may be a customer of financial institution 712. Financial institution 712 may, for example, be a bank, but could also be any other type of financial institution, such as an investment company, an insurance company, etc. Depositor may operate a computer 704, which may be located at depositor 702's residence, but could also be located in any other place. Computer 704 may be connected to image capture device 706, which may be a scanner, camera, etc. Computer 704 may be connected to other machines through network 708. The Internet is an example of network 708, although computer 704 could be connected to other machines through any network.

One example of a machine that computer 704 could be connected to through network 708 is server 710, which, in this example, is a server operated by depositor 702's financial institution 712. Server 710 may operate software that implements a web site, and depositor 702 may use that web site to interact with financial institution 712, for example by tendering checks for deposit into an account with financial institution 712 through the web site. As previously discussed, one way that a depositor could tender a check for deposit is to provide scanned images of the check and to upload the images to a web site associated with a bank. If depositor 702 uses image capture device 706 to scan images of a check, and then uses a browser running on computer 704 to upload such images to server 710 through network 708, then this scenario would be one example of the subject matter described herein. However, the subject matter described herein encompasses other scenarios.

Financial institutions 716 and 718 are financial institutions such as banks, investment companies, insurance companies, etc. They may also include a clearinghouse or a national central bank (such as the Federal Reserve or a branch thereof). Financial institutions 712, 716, and 718 may communicate with each other via a network 714. Network 714 may be a publicly-accessible network, such as the Internet, but also may be a private network. For example, financial institutions 712, 716, and 718 may have security issues when they communicate with each other that do not apply to ordinary communications, and thus network 714 may provide security features that network 708 does not. However, network 714 could be any type of network.

Account 722, in the example of FIG. 7 is an account that depositor 702 maintains at financial institution 712. Depositor 702 may be in possession of a check that is drawn against account 724 maintained at financial institution 718 (in which case financial institution 718 is the drawee). Depositor 702 may deposit the check into account 722 by delivering the check to financial institution 712, where such delivery may be in the form of physical delivery of the original paper check, sending an image of the check, etc. Upon receipt of the check (whether in paper form, image form, or otherwise), financial institution 712 may clear the check by presenting the check through a banking system, such as banking system 720. Presentment of the check may be made directly to drawee financial institution 718, or could be made to an intermediary financial institution, such as a branch of the Federal Reserve, a correspondent bank, a clearinghouse, etc. The intermediary bank can be a government actor (as in the case of the Federal Reserve in the United States, or the central bank of another country), or it could be a commercial actor, such as a correspondent bank or clearinghouse.

In one example, the check is cleared by presenting the check to financial institution 716, which may, for example, be a regional branch of the Federal Reserve, along with a request for payment. Financial institutions 712 and 718 may each have accounts at financial institution 716. Financial institution 712 may create a substitute check using an image provided by depositor 702, and may present the substitute check to financial institution 716. Upon receiving the substitute check, financial institution 716 may identify financial institution 718 as the drawee bank—e.g., by using the nine-digit routing number that is normally printed on checks in the United States. Financial institution 716 may then present the substitute check to financial institution 718 and request that the check be paid. If financial institution 718 agrees to honor the check, then financial institution 716 may then settle the check by debiting funds from an account of financial institution 718 and crediting funds to an account of financial institution 712.

It will be appreciated that the preceding examples are for illustration, and not limitation. For example, financial institution 718 may have a relationship with financial institution 712, and financial institution 712 may use this relationship to clear the check directly with financial institution 718, while bypassing the Federal Reserve, other national central bank, or clearinghouse. In addition, accounts 722 and 724 could be held at the same financial institution 712, in which case the check may be cleared internally.

Figure 8:
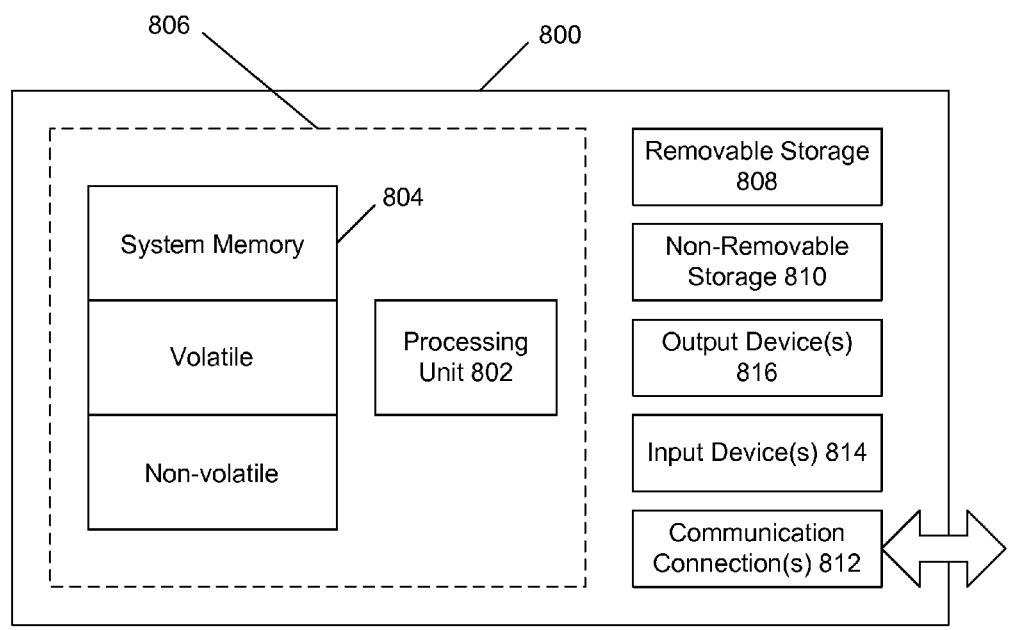
FIG. 8 is a block diagram of an example computing environment in which example embodiments and aspects may be implemented.

The subject matter described herein may be implemented through the use of a computer system, or other type of device that has some computing mechanism(s). FIG. 8 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an example system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by computing device 800 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 804, removable storage 808, and non-removable storage 810 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications connection(s) 812 that allow the device to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

The invention claimed is:

1. A negotiable instrument processing system comprising:
a memory; and
a processor in communication with the memory and configured to:
communicate, via a network, with a network browser running on a computing device associated with a depositor;
determine whether instructions, when executed using the network browser of the computing device associated with the depositor, can control a hardware image capture device in communication with the network browser; and
in response to determining that the instructions can control the image capture device, send, via the network, the instructions to the computing device associated with the depositor, the instructions configured for execution using the network browser running on the computing device associated with the depositor, the instructions further configured, upon execution, to:
request data listed on a negotiable instrument;
receive depositor input indicative of the data listed on the negotiable instrument;
set at least one parameter on a hardware image capture device in communication with the network browser in order to generate an image of the negotiable instrument sufficient to identify the data listed on the negotiable instrument;
request activation of the image capture device;
receive depositor input indicative of authorizing activation of the image capture device;

in response to receiving the depositor input indicative of authorizing activation of the image capture device, command the image capture device to obtain an image of the negotiable instrument using the image capture device set at the at least one parameter; and send, via the network, the image of the negotiable instrument and the depositor input indicative of the data listed on the negotiable instrument for analysis of the image of the negotiable instrument in order to verify that the input indicative of the data listed on the negotiable instrument matches the data listed on the negotiable instrument in the image, wherein the instructions, upon execution using the network browser running on the depositor-controlled computing device, causes the setting of the at least one parameter on the image capture device to enable, upon activation of the image capture device, the image capture device to capture the image with the setting of the at least one parameter.

2. The negotiable instrument processing system of claim 1, wherein the processor is configured to determine whether instructions can control the image capture device by determining whether the negotiable instrument processing system includes information to send to the computing device associated with the depositor in order to enable control of the image capture device.

3. The negotiable instrument processing system of claim 2, wherein the information comprises a certificate, the certificate for use with a driver to control the image capture device.

4. The negotiable instrument processing system of claim 1, wherein, in response to determining that the instructions cannot control the image capture device, the processor is configured to send one or more manual configuration instructions to the computing device associated with the depositor in order for a depositor to manually configure the image capture device.

5. The negotiable instrument processing system of claim 4, wherein the one or more manual configuration instructions comprise an instruction to configure resolution of the image capture device.

6. The negotiable instrument processing system of claim 4, wherein the one or more manual configuration instructions comprise an instruction to configure the image capture device to generate the image in a particular format.

7. A method for processing a negotiable instrument comprising:
communicating, via a network, with a network browser running on a computing device associated with a depositor;
determining, using at least one processor, whether instructions, when executed using the network browser of the computing device associated with the depositor, can control a hardware image capture device in communication with the network browser; and
in response to determining that the instructions can control the image capture device, sending, via the network, the instructions to the computing device associated with the depositor, the instructions configured for execution using the network browser running on the computing device associated with the depositor, the instructions further configured, upon execution, to:
request data listed on a negotiable instrument;
receive depositor input indicative of the data listed on the negotiable instrument;
set at least one parameter on a hardware image capture device in communication with the network browser in order to generate an image of the negotiable instrument sufficient to identify the data listed on the negotiable instrument;
request activation of the image capture device;
receive depositor input indicative of authorizing activation of the image capture device;
in response to receiving the depositor input indicative of authorizing activation of the image capture device, command the image capture device to obtain an image of the negotiable instrument using the image capture device set at the at least one parameter; and
send, via the network, the image of the negotiable instrument and the depositor input indicative of the data listed on the negotiable instrument for analysis of the image of the negotiable instrument in order to verify that the input indicative of the data listed on the negotiable instrument matches the data listed on the negotiable instrument in the image, wherein the instructions, upon execution using the network browser running on the depositor-controlled computing device, causes the setting of the at least one parameter on the image capture device to enable, upon activation of the image capture device, the image capture device to capture the image with the setting of the at least one parameter.

8. The method of claim 7, wherein determining whether instructions can control the image capture device comprises determining whether a negotiable instrument processing system includes information to send to the computing device associated with the depositor in order to enable control of the image capture device.

9. The method of claim 8, wherein the information comprises a certificate, the certificate for use with a driver to control the image capture device.

10. The method of claim 7, wherein, if it is determined that the instructions cannot control the image capture device, sending one or more manual configuration instructions to the computing device associated with the depositor in order for a depositor to manually configure the image capture device.

11. The method of claim 10, wherein the one or more manual configuration instructions comprise an instruction to configure resolution of the image capture device.

12. The method of claim 10, wherein the one or more manual configuration instructions comprise an instruction to configure the image capture device to generate the image in a particular format.

13. A non-transitory computer-readable storage medium comprising computer-readable instructions configured for execution by a negotiable instrument processing system, the computer-readable instructions that, when executed by a computer:
communicate, via a network, with a network browser running on a computing device associated with a depositor;
determine whether network browser instructions, when executed using the network browser of the computing device associated with the depositor, can control a hardware image capture device in communication with the network browser; and
in response to determining that the network browser instructions can control the image capture device, send, via the network, the network browser instructions to the computing device associated with the depositor, the network browser instructions configured for execution using the network browser running on the computing device associated with the depositor, the network browser instructions further configured, upon execution, to:

request data listed on a negotiable instrument;

receive depositor input indicative of the data listed on the negotiable instrument;

set at least one parameter on a hardware image capture device in communication with the network browser in order to generate an image of the negotiable instrument sufficient to identify the data listed on the negotiable instrument;

request activation of the image capture device;

receive depositor input indicative of authorizing activation of the image capture device;

in response to receiving the depositor input indicative of authorizing activation of the image capture device, command the image capture device to obtain an image of the negotiable instrument using the image capture device set at the at least one parameter; and send, via the network, the image of the negotiable instrument and the depositor input indicative of the data listed on the negotiable instrument for analysis of the image of the negotiable instrument in order to verify that the input indicative of the data listed on the negotiable instrument matches the data listed on the negotiable instrument in the image, wherein the network browser instructions, upon execution using the network browser running on the depositor-controlled computing device, causes the setting of the at least one parameter on the image capture device to enable, upon activation of the image capture device, the image capture device to capture the image with the setting of the at least one parameter.

14. The computer-readable storage medium of claim 13, wherein the computer-readable instructions, when executed by a computer, determine whether network browser instructions can control the image capture device by determining whether the negotiable instrument processing system includes information to send to the computing device associated with the depositor in order to enable control of the image capture device.

15. The computer-readable storage medium of claim 14, wherein the information comprises a certificate, the certificate for use with a driver to control the image capture device.

16. The computer-readable storage medium of claim 13, wherein, in response to determining that the network browser instructions cannot control the image capture device, the computer-readable instructions, when executed by a computer, send one or more manual configuration instructions to the computing device associated with the depositor in order for a depositor to manually configure the image capture device.

17. The computer-readable storage medium of claim 16, wherein the one or more manual configuration instructions in order for the depositor to manually configure the image capture device comprise an instruction to configure resolution of the image capture device.

18. The computer-readable storage medium of claim 16, wherein the one or more manual configuration instructions in order for the depositor to manually configure the image capture device comprise an instruction to configure the image capture device to generate the image in a particular format.

19. The negotiable instrument processing system of claim 1, wherein the processor is further configured to send a network browser-executable control that enables a depositor to place a corner marker in the image in order for the depositor to manually indicate a corner of a negotiable instrument in the image.

20. The negotiable instrument processing system of claim 1, wherein the negotiable instrument comprises a check; and wherein the image capture device comprises a camera.

* * * * *